(12) United States Patent
Noguchi et al.

(10) Patent No.: US 7,969,148 B2
(45) Date of Patent: Jun. 28, 2011

(54) MAGNETIC SENSOR DEVICE, MAGNETIC ENCODER DEVICE AND MAGNETIC SCALE MANUFACTURING METHOD

(75) Inventors: Naoyuki Noguchi, Nagano (JP);
Katsuya Moriyama, Nagano (JP);
Teruhiko Otaki, Nagano (JP);
Fusayoshi Argua, Nagano (JP); Toshio Mizoguchi, Nagano (JP)

(73) Assignee: Nidec Sankyo Corporation (JP)

( * ) Notice: Subject to any disclaimer, the term of this patent is extended or adjusted under 35 U.S.C. 154(b) by 363 days.

(21) Appl. No.: 12/224,915

(22) PCT Filed: Mar. 5, 2007

(86) PCT No.: PCT/JP2007/054191
§ 371 (c)(1),
(2), (4) Date: Sep. 5, 2008

(87) PCT Pub. No.: WO2007/102465
PCT Pub. Date: Sep. 13, 2007

(65) Prior Publication Data
US 2010/0156400 A1    Jun. 24, 2010

(30) Foreign Application Priority Data

Mar. 6, 2006  (JP) .................................. 2006-059841
Jul. 21, 2006  (JP) .................................. 2006-200038

(51) Int. Cl.
*G01B 7/30* (2006.01)
(52) U.S. Cl. .......... 324/207.25; 324/207.24; 324/207.21
(58) Field of Classification Search .................... None
See application file for complete search history.

(56) References Cited

U.S. PATENT DOCUMENTS

| 5,036,319 | A  | * | 7/1991 | Shiraki et al. | .................... 341/15 |
| 5,208,535 | A  | * | 5/1993 | Nakayama et al. | ........... 324/318 |
| 6,304,079 | B1 | * | 10/2001 | Kenjo et al. | .............. 324/207.21 |

FOREIGN PATENT DOCUMENTS

| JP | 01-212323 | 8/1989 |
| JP | 01-301113 | 12/1989 |
| JP | 4078561 U | 7/1992 |
| JP | 04-269625 | 9/1992 |

(Continued)

OTHER PUBLICATIONS

International Search Report for International Patent Application No. PCT/JP2007/054191 mailed May 1, 2007.

*Primary Examiner* — Minh N Tang
(74) *Attorney, Agent, or Firm* — Cantor Colburn LLP

(57) ABSTRACT

A magnetic sensor device may include "A"-phase magnetic resistance pattern and "B"-phase magnetic resistance pattern which are provided with a phase difference of 90° from each other; wherein the "A" pattern is provided with "+a" phase magnetic resistance pattern and "−a" phase magnetic resistance pattern with a phase difference of 180° from each other for detecting movement of a magnetic scale, and the "B" pattern is provided with "+b" phase magnetic resistance pattern and "−b" phase magnetic resistance pattern with a phase difference of 180° from each other for detecting movement of the magnetic scale, and the "+a" pattern, the "−a" pattern, the "+b" pattern and the "−b" pattern are formed on a same face of one piece of board so that the "+a" pattern and the "−a" pattern are diagonally located and the "+b" pattern and the "−b" pattern are diagonally located.

23 Claims, 21 Drawing Sheets

FOREIGN PATENT DOCUMENTS

| | | |
|---|---|---|
| JP | 05-183212 | 7/1993 |
| JP | 06-088704 | 3/1994 |
| JP | 06-207834 | 7/1994 |
| JP | 07-063505 | 3/1995 |
| JP | 2005-249774 | 9/2005 |
| JP | 2005-327859 | 11/2005 |

* cited by examiner

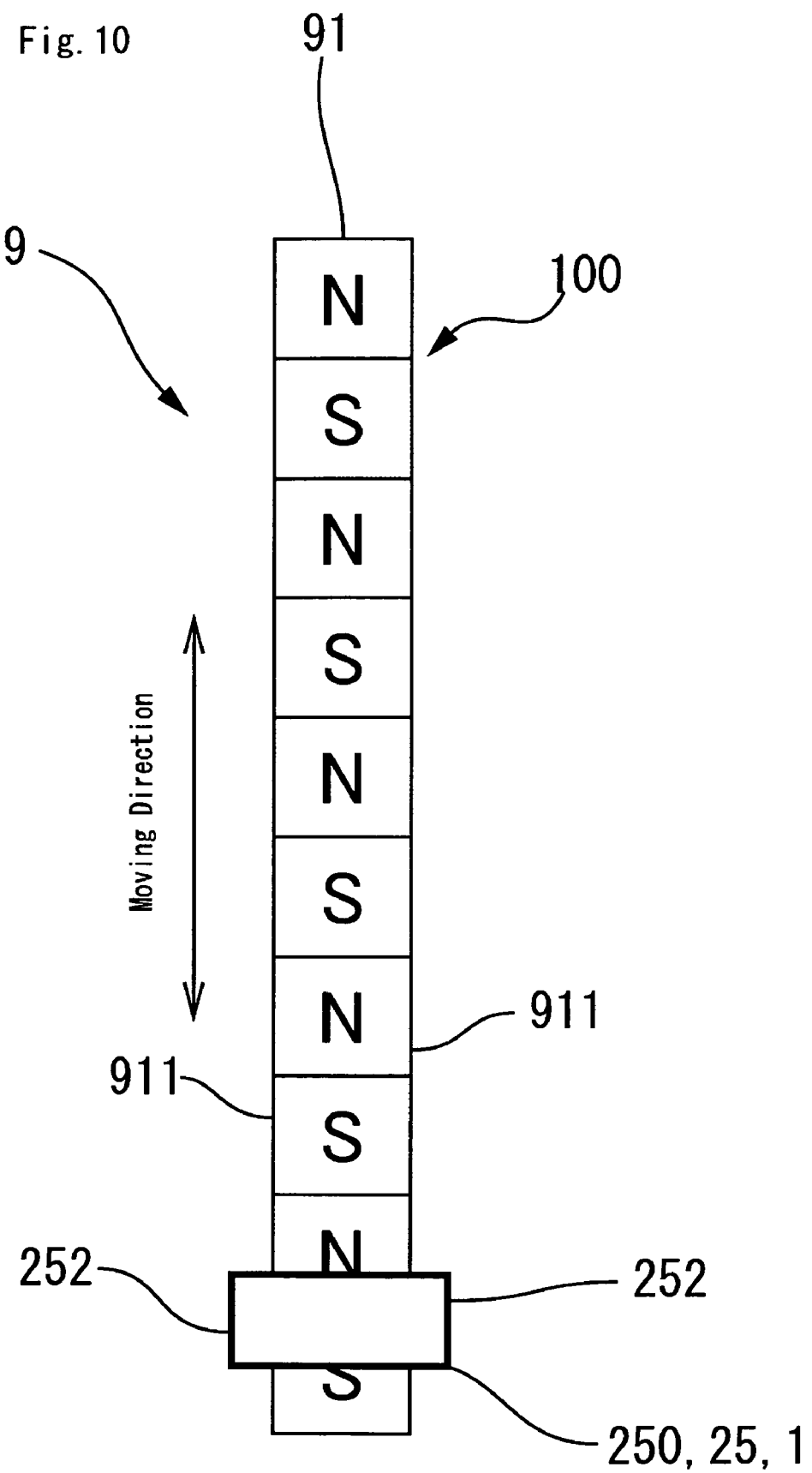

Moving Direction

Moving Direction

Moving Direction

Moving Direction

Moving Direction

Moving Direction

Moving Direction

Moving Direction

Moving Direction

MAGNETIC SENSOR DEVICE, MAGNETIC ENCODER DEVICE AND MAGNETIC SCALE MANUFACTURING METHOD

CROSS REFERENCE TO RELATED APPLICATIONS

This is a U.S. national stage of application No. PCT/JP2007/054191, filed on Mar. 5, 2007. Priority under 35 U.S.C. §119(a) and 35 U.S.C. §365(b) is claimed herein from Japanese Application No. 2006-059841, filed Mar. 6, 2006 and Japanese Patent Application No. 2006-200038, filed Jul. 21, 2006, the disclosures of which are also incorporated herein by reference.

FIELD OF THE INVENTION

The present invention relates to a magnetic sensor device, and to a magnetic type encoder device with the use of the magnetic sensor device, and to a manufacturing method for a magnetic scale.

BACKGROUND

A magnetic type encoder device includes, for example, as shown in FIG. 21, a magnetic sensor device 1001 provided with a magneto-resistive element on its sensor face and a magnetic scale 1009 which is provided with a permanent magnet and is relatively moved with respect to the magnetic sensor device 1001. The magnetic scale 1009 is formed with a track where an "N"-pole and an "S"-pole are alternately arranged along a relatively moving direction with respect to the magnetic sensor device 1001. Further, in the magnetic sensor device 1001, a rigid board 1010a of two pieces of rigid boards is formed with a "+a" phase magnetic resistance pattern 1025(+a) which is a magnetic resistance pattern of phase "A" and a "+b" phase magnetic resistance pattern 1025(+b) which is a magnetic resistance pattern of phase "B". The other rigid board 1010b is formed with a "−a" phase magnetic resistance pattern 1025(−a) which is a magnetic resistance pattern of phase "A" and a "−b" phase magnetic resistance pattern 1025(−b) which is a magnetic resistance pattern of phase "B". These two pieces of the rigid boards 1010a and 1010b are disposed to be faced each other. The magnetic resistance pattern of phase "A" and the magnetic resistance pattern of phase "B" detect movement of the magnetic scale 1009 with a phase difference of 90°. On the other hand, the "+a" phase magnetic resistance pattern 1025(+a) and the "−a" phase magnetic resistance pattern 1025(−a) detect movement of the magnetic scale 1009 with a phase difference of 180° and thus moving detection of the magnetic scale 1009 can be performed from a differential output of them. Further, the "+b" phase magnetic resistance pattern 1025(+b) and the "−b" phase magnetic resistance pattern 1025(−b) detect movement of the magnetic scale 1009 with a phase difference of 180° and thus moving detection of the magnetic scale 1009 can be performed from a differential output of them (see, for example, Patent Reference 1 or 2).

[Patent Reference 1] Japanese Patent Laid-Open No. 2005-249774

[Patent Reference 2] Japanese Patent Laid-Open No. Hei 6-207834

SUMMARY OF THE INVENTION

However, as shown in FIG. 21, in a case that two pieces of the rigid boards 1010a and 1010b are disposed so as to be faced each other to structure the magnetic sensor device 1001, when a dimension of gap space is varied, an offset varies and interpolation precision deteriorates due to sensitivity difference of the magnetic resistance patterns respectively formed in the two pieces of the rigid boards 1010a and 1010b.

Further, there are commonly two types of a magnetic type encoder device, i.e., a type in which a position is detected by strength of a magnetic field in a fixed direction, and a type in which a direction of a rotary magnetic field (rotation of a vector of magnetic field) is detected in a magnetic field intensity higher than a saturated sensitivity region (commonly, for example, a region except a region where the variation amount of resistance value "k" can be approximately represented by an expression of "k∝$H^2$" with respect to the magnetic field intensity H. In these detection methods, a principle for detecting a direction of the rotary magnetic field utilizes a relationship that, in a state that an electric current is supplied to a magnetic resistance pattern made of ferromagnetic metal, when a magnetic field intensity which causes a resistance value to be saturated is applied, the following expression is satisfied between the angle θ defined by the magnetic field and the electric current direction and the resistance value R of the magnetic resistance pattern;

$R = R_0 - k \times \sin^2 \theta$ $R_0$: Resistance value in a non-magnetic field k: variation amount of resistance value (constant when more than saturated sensitivity region)

In other words, the resistance value R is varied when the angle θ varies and thus a relative moving speed and a moving direction of the magnetic scale 1009 to the magnetic sensor device 1001 can be detected. Further, in the method in which the strength of magnetic field is detected, when a gap space dimension between the magnetic scale 1009 and the magnetic sensor device 1001 is set to be narrow in order to improve the S/N ratio, waveform distortion becomes larger. On the other hand, in the method in which the rotary magnetic field is detected, in other words, in the method in which a rotation angle of a vector of the magnetic field is detected with a relative movement of the magnetic scale 1009 to the magnetic sensor device 1001, a sine-wave component can be stably obtained even when a gap space dimension between the magnetic scale 1009 and the magnetic sensor device 1001 is set to be narrow.

In the method of detecting of the rotary magnetic field, a large magnetic field intensity is required but, as shown in FIG. 21, in the structure where two pieces of the rigid boards 1010a and 1010b are disposed to be faced each other, the gap space dimension between the magnetic resistance pattern and the magnetic scale 1009 cannot be narrowed because the rigid board 1010b is interposed between the magnetic resistance pattern and the magnetic scale 1009.

Further, in the method of detecting of the rotary magnetic field, similarly to the method of detecting of the strength of the magnetic field, even when magnet material of the magnetic scale 1009 (permanent magnet) is determined with the maximum value (BH)max of an energy product as an index which is obtained from a product of a magnitude H of an external magnetic field by a magnetic flux density B in the magnetization curve, a sufficient detection accuracy is not obtained.

In view of the problems described above, at least an embodiment of the present invention may be directed to providing a magnetic sensor device and a magnetic type encoder device in which a high degree of detection accuracy can be obtained even when a gap space dimension between a magnetic sensor device and a magnetic scale is varied. At least an embodiment may also be directed to providing a magnetic sensor device and a magnetic type encoder device suitable for detection of a rotary magnetic field.

Further, at least an embodiment of the present invention may be directed to providing a magnetic type encoder device in which a high degree of detection accuracy can be obtained even when a rotary magnetic field detection method is utilized, and to providing a manufacturing method of a magnetic scale which is suitable to use in the magnetic type encoder device.

MEANS TO SOLVE THE PROBLEMS

In order to solve the above-mentioned problems, according to at least an embodiment of the present invention, a magnetic sensor device comprises "A"-phase magnetic resistance pattern and "B"-phase magnetic resistance pattern which are provided with a phase difference of 90° each other, the "A"-phase magnetic resistance pattern is provided with "+a" phase magnetic resistance pattern and "−a" phase magnetic resistance pattern with a phase difference of 180° each other for detecting movement of a magnetic scale, and the "B"-phase magnetic resistance pattern is provided with "+b" phase magnetic resistance pattern and "−b" phase magnetic resistance pattern with a phase difference of 180° each other for detecting movement of the magnetic scale, and the "+a" phase magnetic resistance pattern, the "−a" phase magnetic resistance pattern, the "+b" phase magnetic resistance pattern and the "−b" phase magnetic resistance pattern are formed on the same face of one piece of board so that the "+a" phase magnetic resistance pattern and the "−a" phase magnetic resistance pattern are diagonally located and the "+b" phase magnetic resistance pattern and the "−b" phase magnetic resistance pattern are diagonally located.

In accordance with at least an embodiment of the present invention, the "+a" phase magnetic resistance pattern and the "−a" phase magnetic resistance pattern are diagonally located and the "+b" phase magnetic resistance pattern and the "−b" phase magnetic resistance pattern are diagonally located. Therefore, magnetic resistance patterns having four phases can be drawn on the same face and all of the magnetic resistance pattern structuring "A"-phase and the magnetic resistance pattern structuring "B"-phase can be formed on the same face of one piece of board. Therefore, all the magnetic resistance patterns are provided with the same sensitivity and thus, even when a gap space dimension between a sensor face and a magnetic scale is varied, an offset is not varied and a high degree of interpolation precision can be obtained. Accordingly, even when the sensor face is inclined to the magnetic scale at the time of assembling, effect on the interpolation precision can be suppressed. Further, since drawing of the magnetic resistance patterns is easy, a number of patterns for cancellation for high frequency can be disposed.

In at least an embodiment of the present invention, it is preferable that one of the "+a" phase magnetic resistance pattern and the "−a" phase magnetic resistance pattern and one of the "+b" phase magnetic resistance pattern and the "−b" phase magnetic resistance pattern are connected to a first common terminal which is formed between a region formed with the one of the "+a" phase magnetic resistance pattern and the "−a" phase magnetic resistance pattern and a region formed with the one of the "+b" phase magnetic resistance pattern and the "−b" phase magnetic resistance pattern, and the other of the "+a" phase magnetic resistance pattern and the "−a" phase magnetic resistance pattern and the other of the "+b" phase magnetic resistance pattern and the "−b" phase magnetic resistance pattern are connected to a second common terminal formed between a region formed with the other of the "+a" phase magnetic resistance pattern and the "−a" phase magnetic resistance pattern and a region formed with the other of the "+b" phase magnetic resistance pattern and the "−b" phase magnetic resistance pattern. According to the structure as described above, the magnetic resistance patterns of different phases can be arranged closely to each other on the board and thus detection accuracy can be improved.

The magnetic sensor device in accordance with at least an embodiment of the present invention can be utilized together with a magnetic scale provided with a track in which an "N"-pole and an "S"-pole are alternately arranged along a relative moving direction with respect to the magnetic sensor device to structure a magnetic type encoder device. In this case, the magnetic encoder device in accordance with at least an embodiment of the present invention may be structured as a type for detecting a position through strength of a magnetic field having a constant direction and, alternatively, as a type for detecting a direction of a rotary magnetic field having a magnetic field intensity more than a saturated sensitivity region. Further, the magnetic encoder device can be structured as a type for detecting a direction of a rotary magnetic field having a magnetic field intensity in a region except the saturated sensitivity region.

At least an embodiment of the present invention is effectively applied to a magnetic type encoder device in which a sensor face of the magnetic sensor device which is structured of the "A"-phase magnetic resistance pattern and the "B"-phase magnetic resistance pattern oppositely facing the magnetic scale is oppositely faced to the track, and a rotary magnetic field in which directions of in-plane direction in the magnetic scale are changed is detected. In this case, it is preferable that the sensor face is formed in a size in a widthwise direction of the track so that both end portions of the sensor face is protruded from edge portions of both ends in the widthwise direction of the track which is oppositely faced to the both end portions of the sensor face. In addition, it is preferable that the sensor face of the magnetic sensor device is oppositely faced to an edge portion in a widthwise direction of the track and a rotary magnetic field in which directions of in-plane direction are changed is capable of being detected at the edge portion. The present applicants have investigated and examined a magnetic field on a surface of the magnetic scale and obtained a new knowledge that a rotary magnetic field in which directions of in-plane direction are changed is formed at an edge portion in a widthwise direction of the track where an "N"-pole and an "S"-pole are alternately arranged. At least an embodiment of the present invention is based on this new knowledge and, in a case that a rotary magnetic field in which directions of in-plane direction are changed is formed at the edge portion in the widthwise direction of the track, when a sensor face of the magnetic sensor device is oppositely faced to the vicinity of the edge portion in the widthwise direction of the track, the rotary magnetic field can be detected and a magnetic type encoder device can be structured. Further, when a sensor face of a magnetic sensor device is oppositely faced to a magnetic scale, different from a case where the sensor face is perpendicularly directed to the magnetic scale, a situation can be avoided in which the magnetic field does not reach to the saturated sensitivity region at a position apart from the magnetic scale. Therefore, detection accuracy can be improved. In addition, in accordance with at least an embodiment of the present invention, all of the magnetic resistance pattern structuring "A"-phase and the magnetic resistance pattern structuring "B"-phase are formed on the same face of one piece of board. Therefore, when a face of the board on which the magnetic resistance patterns are formed is directed to the magnetic scale, a gap space dimension between the magnetic resistance patterns and the magnetic scale can be reduced. Accordingly, the magnetic resistance patterns can be disposed in the magnetic field which is capable of detecting the rotary magnetic field.

In at least an embodiment of the present invention, a structure may be employed in which a plurality of the tracks is juxtaposed in a widthwise direction in the magnetic scale, and positions of "N"-pole and "S"-pole in adjacent tracks are shifted with each other in a relatively moving direction. For example, a structure may be employed in which, in a plurality of the tracks, the positions of "N"-pole and "S"-pole in the adjacent tracks are shifted by one magnetic pole in the relatively moving direction. When the positions of "N"-pole and "S"-pole are shifted in the relatively moving direction in adjacent tracks, a rotary magnetic field having a large strength is generated at boundary portions of the tracks in the edge portions in the widthwise direction of the tracks. Therefore, when a sensor face of the magnetic sensor is oppositely faced to the above-mentioned boundary portions of the tracks, sensitivity of the magnetic type encoder device can be improved.

In accordance with at least an embodiment of the present invention, it is preferable that three or more tracks are juxtaposed in lines in the widthwise direction in the magnetic scale, and the sensor face is oppositely faced to three or more tracks in the widthwise direction, and positions of "N"-pole and "S"-pole in the relatively moving direction in tracks which are oppositely faced to both end portions of the sensor face are coincided with each other. According to the structure as described above, even when relative positions in the widthwise direction between the magnetic sensor device and the magnetic scale are shifted, detection sensitivity is not varied.

In accordance with at least an embodiment of the present invention, it is preferable that the "N"-pole and the "S"-pole are directly contacted with each other in adjacent tracks of a plurality of the tracks. In other words, for example, a non-magnetized portion where a magnetic pole is not present or a nonmagnetic portion is not interposed between the "N"-pole and the "S"-pole between adjacent tracks and thus a rotary magnetic field having a further larger strength can be generated in the boundary portion of the adjacent tracks.

The magnetic type encoder device in accordance with at least an embodiment of the present invention may be structured as an encoder either of a linear encoder or a rotary encoder.

Further, in order to solve the above-mentioned problems, according to a at least an embodiment of the second invention, a magnetic type encoder device comprises a magnetic scale which is provided with a permanent magnet, and a magnetic sensor device which is provided with a magneto-resistive element for detecting magnetic field from the magnetic scale, and a track which is formed in the permanent magnet so that "N"-pole and "S"-pole are alternately arranged along a relatively moving direction with respect to the magnetic sensor device. The magnetic sensor device detects a rotary magnetic field in which directions of in-plane direction are changed at an edge portion in a widthwise direction of the track, and a thickness of the permanent magnet is 1 mm or more, preferably 2 mm or more.

In at least an embodiment of the present invention, since a method for detecting a rotary magnetic field is employed, even when a gap space dimension between the magnetic sensor device and the magnetic scale is reduced for improving the S/N ratio, a sine wave component can be stably obtained. Further, the present applicants have obtained a knowledge from various investigations in which, in a case of detecting method of a rotary magnetic field, a sufficient detection accuracy can be obtained by setting a thickness of a permanent magnet as an index as compared with a case in which the maximum value (BH)max of the energy product is used as an index. Therefore, on the basis of this knowledge, a thickness of the permanent magnet is set to be 1 mm or more, preferably 2 mm or more and thus a sufficient detection accuracy can be obtained.

In accordance with another embodiment of the present invention, a magnetic type encoder device comprises a magnetic scale which is provided with a permanent magnet, a magnetic sensor device which is provided with a magneto-resistive element for detecting magnetic field from the magnetic scale, and a track which is formed in the permanent magnet so that "N"-pole and "S"-pole are alternately arranged along a relatively moving direction with respect to the magnetic sensor device. The magnetic sensor device detects a rotary magnetic field in which directions of in-plane direction at an edge portion in a widthwise direction of the track are changed, and detects a magnetic field in a region showing a resistance change rate which is 20% or more with respect to a maximum resistance change rate from a resistance value in a non-magnetic field in a magneto-resistance curve of the magneto-resistive element and outputs.

In at least an embodiment of the present invention, since a method for detecting a rotary magnetic field is employed, even when a gap space dimension between the magnetic sensor device and the magnetic scale is reduced for improving the S/N ratio, a sine wave component can be stably obtained. Further, from various investigations of the present applicants, even when a rotary magnetic field detection method is employed, not limited to a saturated sensitivity region, a magnetic field in the saturated sensitivity region and a semi-saturated sensitivity region, which corresponds to a skirt portion of a magneto-resistance curve of a magneto-resistive element where a resistance change rate is 20% or more with respect to the maximum resistance change rate from a resistance value in the non-magnetic field, is utilized and thus a sufficient detection accuracy can be obtained.

In at least an embodiment of the present invention, the above-mentioned two embodiments may be combined with each other. In other words, a magnetic type encoder device comprises a magnetic scale which is provided with a permanent magnet, and a magnetic sensor device which is provided with a magneto-resistive element for detecting magnetic field in the magnetic scale, and a track which is formed in the permanent magnet so that "N"-pole and "S"-pole are alternately arranged along a relatively moving direction with respect to the magnetic sensor device. In the magnetic type encoder device, a structure may be employed in which the magnetic sensor device detects a rotary magnetic field in which directions of in-plane direction are changed at an edge portion in a widthwise direction of the track, and a thickness of the permanent magnet is 1 mm or more, and the magnetic sensor device detects a magnetic field in a region of a resistance change rate which is 20% or more with respect to a maximum resistance change rate from a resistance value in a non-magnetic field in a magneto-resistance curve of the magneto-resistive element and outputs.

In at least an embodiment of the present invention, for example, a rear face of the magnetic scale is provided with a base layer and a front face of the magnetic scale is provided with a protective layer.

In at least an embodiment of the present invention, it is preferable that magnet material which structures the permanent magnet is set so that a maximum value (BH)max of an energy product which is obtained by a product of a magnitude H of an external magnetic field by a magnetic flux density B is 1.2MGOe or more.

In at least an embodiment of the present invention, it is preferable that a plurality of the tracks is juxtaposed in a widthwise direction in the permanent magnet and positions of "N"-pole and "S"-pole are shifted in the relatively moving direction in adjacent tracks of a plurality of the tracks.

In at least an embodiment of the present invention, a structure may be employed in which the positions of the "N"-pole and the "S"-pole are shifted in the relatively moving direction by one magnetic pole in the adjacent tracks of a plurality of the tracks.

In at least an embodiment of the present invention, a structure may be employed in which the tracks are juxtaposed two lines or more in the widthwise direction in the permanent magnet.

In at least an embodiment of the present invention, a structure may be employed in which the tracks are juxtaposed three lines or more in the widthwise direction in the permanent magnet, and the magnetic sensor device faces tracks with lines of an odd number of the three or more tracks, and positions of the "N"-pole and the "S"-pole in the relatively moving direction are coincided with each other in tracks to which both end portions of the magnetic sensor device are oppositely faced.

In at least an embodiment of the present invention, it is preferable that the permanent magnet is an anisotropic magnet whose magnetic pole is directed only in a front-rear direction of the permanent magnet. According to the structure as described above, a strong magnetic field can be obtained.

The magnetic type encoder device in accordance with at least an embodiment of the present invention is structured as a linear encoder or a rotary encoder.

In accordance with at least an embodiment of the present invention, a manufacturing method for a magnetic scale which is provided with a permanent magnet in which a plurality of tracks each of which is provided with an "N"-pole and an "S"-pole alternately arranged is juxtaposed in a widthwise direction and positions of the "N"-pole and the "S"-pole are shifted in a relatively moving direction of the track in adjacent tracks, comprises a first magnetizing step in which magnet material is structured as the permanent magnet is magnetized so that an "N"-pole and an "S"-pole are alternately arranged in the relatively moving direction of the track, and a second magnetizing step in which a part of the magnetic poles magnetized in the magnet material by the first magnetizing step is overwritten so that positions of an "N"-pole and an "S"-pole in adjacent tracks are shifted in the relatively moving direction of the track.

In accordance with at least an embodiment of the present invention, a manufacturing method for a magnetic scale which is provided with a permanent magnet in which a plurality of tracks each of which is provided with an "N"-pole and an "S"-pole alternately arranged is juxtaposed in a widthwise direction and positions of the "N"-pole and the "S"-pole are shifted in a relatively moving direction of the track in adjacent tracks, comprises a magnetizing step in which a magnetizing head is disposed for magnet material to be structured as the permanent magnet so that positions of an "N"-pole and positions of an "S"-pole in the widthwise direction of the permanent magnet are shifted in the relatively moving direction and multi-polar magnetization is performed.

In at least an embodiment of the present invention, it is preferable that anisotropic magnetizing in which magnetic poles are directed only in a front-rear direction of the magnet material is performed to magnetize the magnet material. According to the structure as described above, a strong magnetic field can be obtained.

In at least an embodiment of the present invention, it is preferable that a base layer is superposed on a rear face of the magnet material, and then the magnetizing step is performed to the magnet material to form the permanent magnet, and a protective layer is formed on a surface of the permanent magnet after the magnetizing step has been performed.

In accordance with at least an embodiment of the present invention, the "+a" phase magnetic resistance pattern and the "−a" phase magnetic resistance pattern are diagonally located and the "+b" phase magnetic resistance pattern and the "−b" phase magnetic resistance pattern are diagonally located. Therefore, magnetic resistance patterns having four phases can be drawn on the same face and all of the magnetic resistance pattern structuring "A"-phase and the magnetic resistance pattern structuring "B"-phase can be formed on the same face of one piece of board. Accordingly, all the magnetic resistance patterns are provided with the same sensitivity and thus, even when a gap space dimension between a sensor face and a magnetic scale is varied, an offset is not varied and a high degree of interpolation precision can be obtained. As a result, even when the sensor face is inclined to the magnetic scale at the time of assembling, effect on the interpolation precision can be suppressed. Further, since drawing of the magnetic resistance patterns is easy, a number of patterns for cancellation for high frequency can be disposed.

Further, in the magnetic type encoder device in accordance with at least an embodiment of the present invention, since a method for detecting a rotary magnetic field is employed, even when a gap space dimension between the magnetic sensor device and the magnetic scale is reduced for improving the S/N ratio, a sine wave component can be stably obtained. Further, since a thickness of the permanent magnet is set to be 1 mm or more, preferably 2 mm or more and thus a sufficient detection accuracy can be obtained. Further, even when a rotary magnetic field detection method is employed, a magnetic field in the saturated sensitivity region and a semi-saturated sensitivity region corresponding to a skirt portion where a resistance change rate is 20% or more is utilized and thus a sufficient detection accuracy can be obtained.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 is an explanatory view showing another magnetic type encoder device to which at least an embodiment of the present invention is applied.

DETAILED DESCRIPTION OF THE PREFERRED EMBODIMENTS

At least an embodiment for carrying out the present invention will be described with reference to the accompanying drawings.

First Embodiment (Entire Structure)

Figure 1:
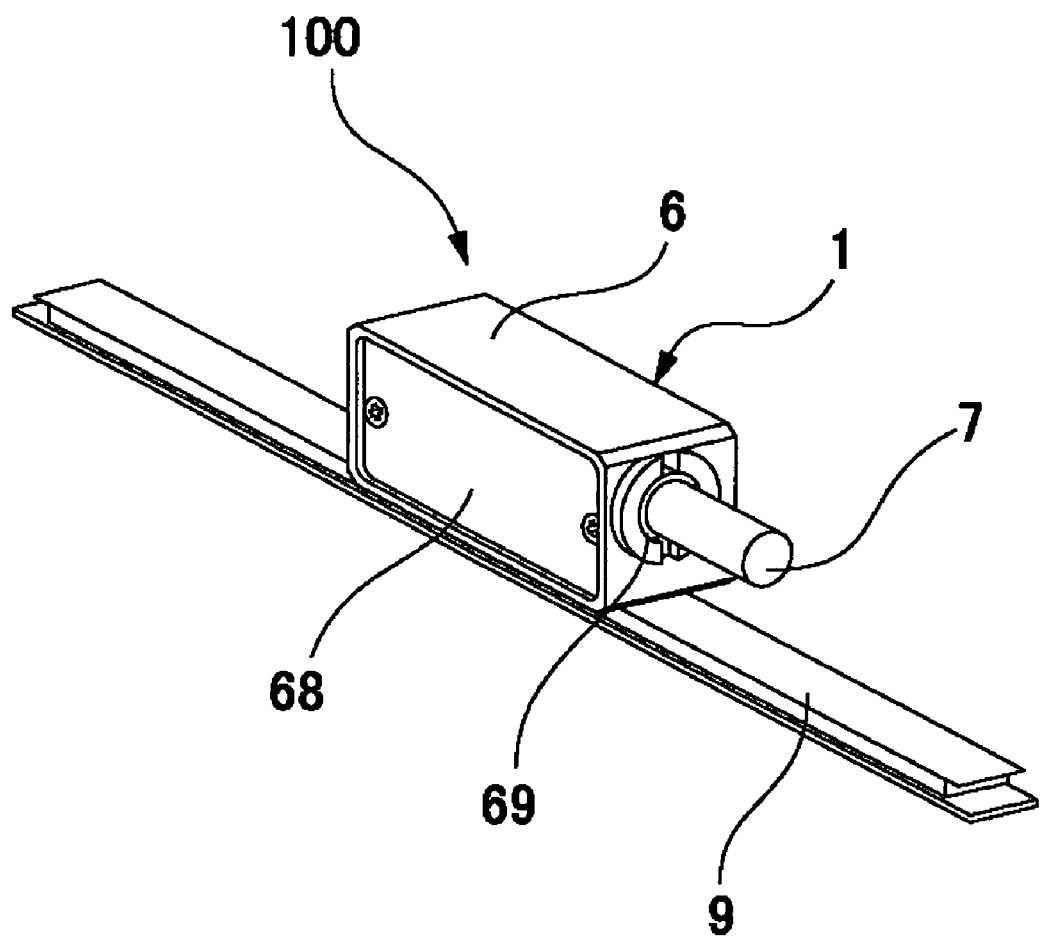
FIG. 1 is an explanatory view showing a magnetic type encoder device to which at least an embodiment of the present invention is applied.
Figure 2A:
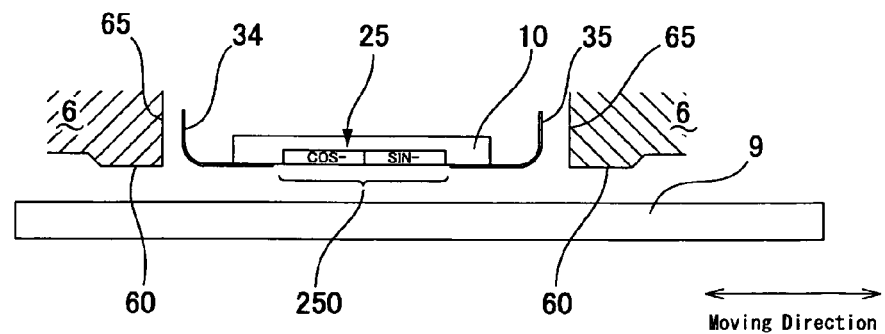
FIGS. 2(a), 2(b) and 2(c) are a schematic cross-sectional view showing a structure of an essential portion of a magnetic sensor device to which at least an embodiment of the present invention is applied, its schematic perspective view, and its schematic plan view.
Figure 2B:
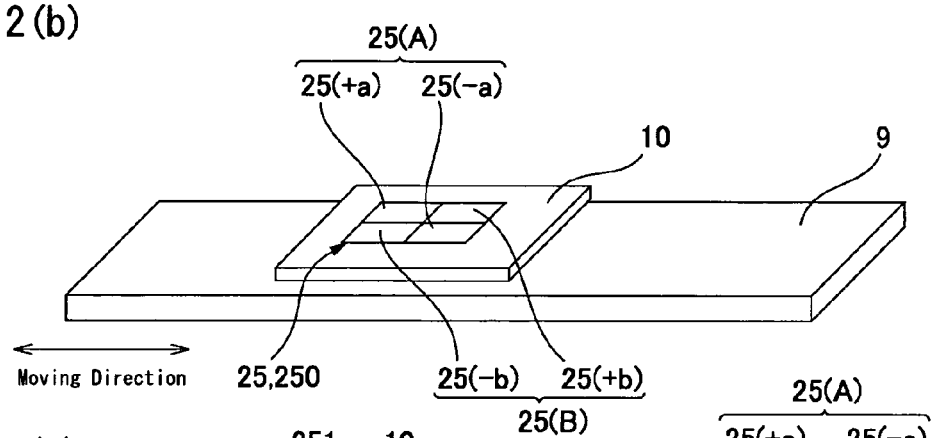
Figure 2C:
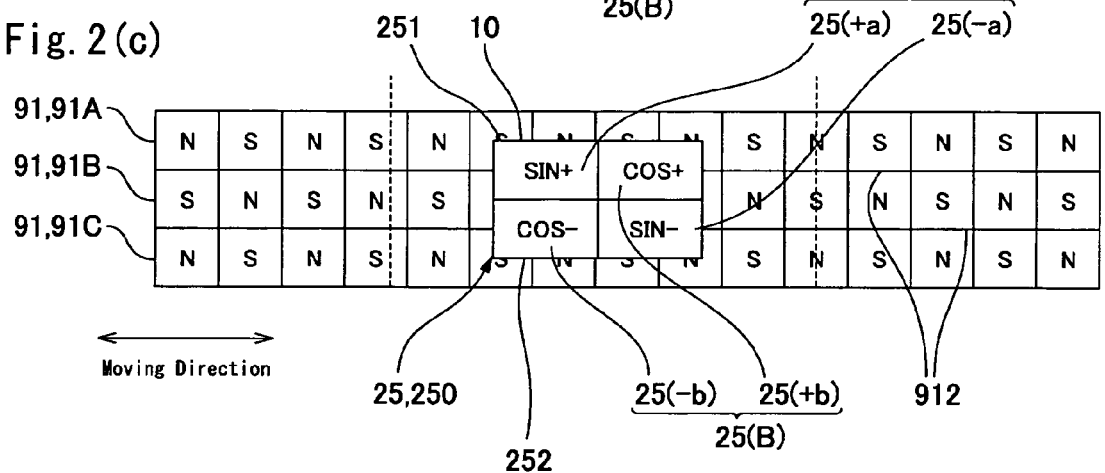

FIG. 1 is an explanatory view showing a magnetic type encoder device to which at least an embodiment of the present invention is applied. FIGS. 2(a), 2(b) and 2(c) are a schematic cross-sectional view showing a structure of an essential portion of a magnetic sensor device to which at least an embodiment of the present invention is applied, its schematic perspective view, and its schematic plan view.

As shown in FIG. 1, a magnetic sensor device 1 in this embodiment is used in a magnetic type linear encoder device 100 (magnetic type encoder device), and a magnetic scale 9 fixed to a movable member (not shown) is faced with a bottom face of the magnetic sensor device 1. The magnetic scale 9 is formed with a track where an "N"-pole and an "S"-pole are alternately arranged along a longitudinal direction (direction of relative movement of the magnetic sensor device 1 to the magnetic scale 9) as described below. The magnetic sensor device 1 detects a direction of a rotary magnetic field formed on the surface of the magnetic scale 9 to detect a moving position when the movable member and the magnetic scale 9 are moved in the longitudinal direction of the magnetic scale 9. The magnetic sensor device 1 includes a holder 6 made of a aluminum die casting product formed in a substantially rectangular parallelepiped shape, a rectangular cover 68 for covering an opening of the holder 6, and a cable 7 which is extended from the holder 6. A cable through hole 69 is formed on a side face of the holder 6 and a cable 7 is drawn out from the cable through hole 69.

As shown in FIGS. 2(a), 2(b) and 2(c), the holder 6 is formed with a reference face 60 which is a flat face protruded through a stepped portion from a bottom face of the holder 6 that faces the magnetic scale 9. An opening part 65 is formed in the reference face 60 and a magneto-resistive element 25 formed on a rigid board 10 such as a silicon substrate or a ceramic glazed substrate is disposed with respect to the opening part 65 to structure a sensor face 250.

The magneto-resistive element 25 includes an "A"-phase magnetic resistance pattern 25(A) and a "B"-phase magnetic resistance pattern 25(B) having a phase difference of 90° each other as a magnetic resistance pattern for detecting the rotary magnetic field in which its direction is changed in an in-plane direction of the magnetic scale 9. The sensor face 250 is structured by lower end faces (respective pattern faces facing the magnetic scale 9) of the "A"-phase magnetic resistance pattern 25(A) and the "B"-phase magnetic resistance pattern 25(B). In the drawing, the "A"-phase magnetic resistance pattern is shown with "SIN" and the "B"-phase magnetic resistance pattern is shown with "COS".

The "A"-phase magnetic resistance pattern 25(A) is provided with a "+a" phase magnetic resistance pattern 25(+a) and a "−a" phase magnetic resistance pattern 25(−a) with a phase difference of 180° for detecting movement of the magnetic scale 9. In the drawing, the "+a" phase magnetic resistance pattern 25(+a) is shown with "SIN+" and the "−a" phase magnetic resistance pattern 25(−a) is shown with "SIN−". Similarly, the "B"-phase magnetic resistance pattern 25(B) is provided with a "+b" phase magnetic resistance pattern 25(+b) and a "−b" phase magnetic resistance pattern 25(−b) with a phase difference of 180° for detecting movement of the magnetic scale 9. In the drawing, the "+b" phase magnetic resistance pattern 25(+b) is shown with "COS+" and the "−b" phase magnetic resistance pattern 25(−b) is shown with "COS−".

In this embodiment, the "+a" phase magnetic resistance pattern 25(+a), the "−a" phase magnetic resistance pattern 25(−a), the "+b" phase magnetic resistance pattern 25(+b), and the "−b" phase magnetic resistance pattern 25(−b) are formed on the same face (principal face) of one piece of the rigid board 10. Further, the magnetic resistance patterns 25(+a), 25(−a), 25(+b) and 25(−b) are disposed in a grid shape on the rigid board 10. The "+a" phase magnetic resistance pattern 25(+a) and the "−a" phase magnetic resistance pattern 25(−a) are formed at a diagonal position and the "+b" phase magnetic resistance pattern 25(+b) and the "−b" phase magnetic resistance pattern 25(−b) are formed at a diagonal position.

The magnetic scale 9 is formed with a track 91 where an "N"-pole and an "S"-pole are alternately arranged along a moving direction. In this embodiment, three rows of the track 91 (91A, 91B, 91C) are juxtaposed in a widthwise direction. Further, in the adjacent tracks 91A, 91B and 91C, positions of the "N"-pole and the "S"-pole are shifted by one magnetic pole in the moving direction. Therefore, positions of the "N"-pole and the "S"-pole are coincided with each other in the moving direction in the both side tracks of 91A and 91C. In addition, a boundary portion 912 between the adjacent tracks 91A and 91B, and a boundary portion 912 between the tracks 91B and 91C are preferably formed so that the adjacent "N"-pole and the "S"-pole of the boundary portion 912 are directly contacted with each other, for example, without interposing a no-magnetized portion where no magnetic pole is present and a nonmagnetic portion. However, when a large rotary magnetic field having a strength capable of being detected by the magnetic sensor device 1 can be generated, a no-magnetized portion where no magnetic pole is present or a nonmagnetic portion may be interposed at the boundary portion 912 of the track 91A and the track 91B adjacent to each other and at the boundary portion 912 of the track 91B and the track 91C.

Figure 3A:
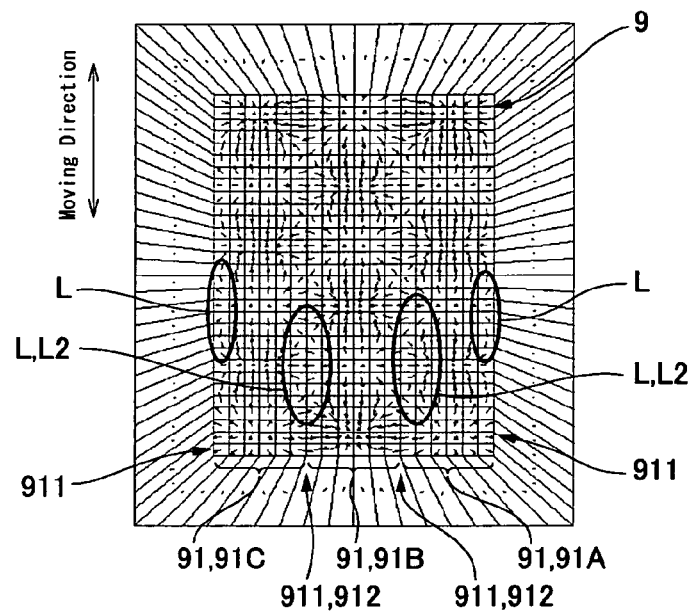
FIGS. 3(a), 3(b) and 3(c) are an explanatory plan view showing directions of magnetic fields formed in a magnetic scale in a magnetic type encoder device to which at least an embodiment of the present invention is applied, its explanatory oblique view and its explanatory side view.
Figure 3B:
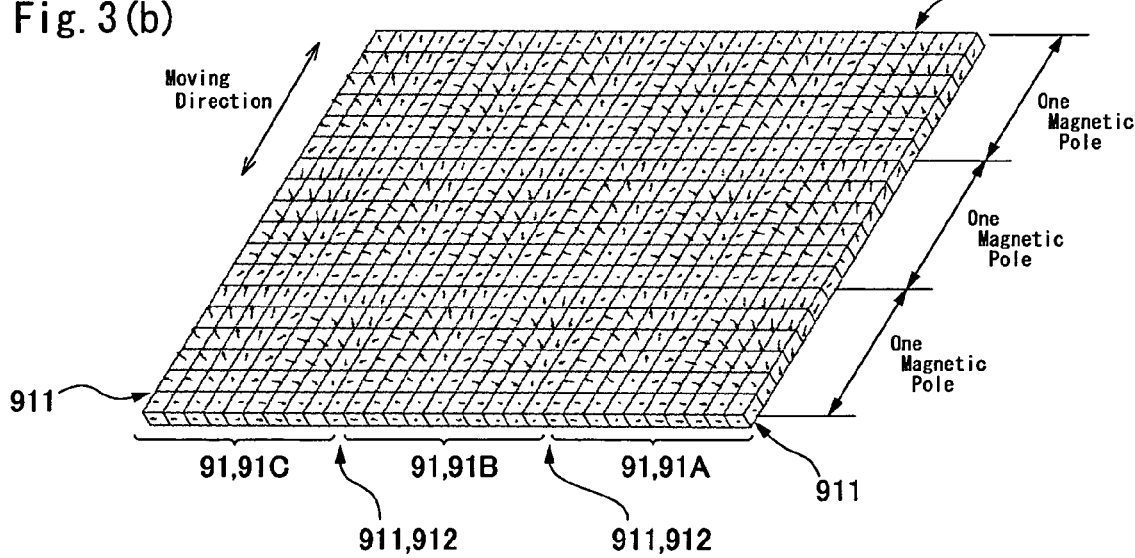
Figure 3C:
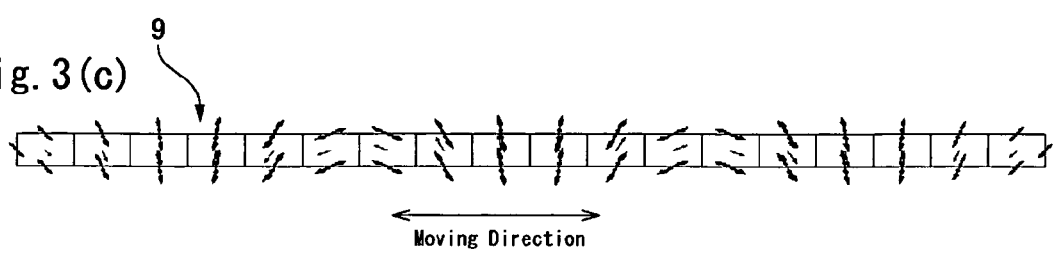

In the magnetic type encoder device 1 structured as described above, when directions of in-plane direction of the magnetic field in the magnetic scale 9 are obtained by a magnetic field analysis for every matrix-shaped minute region, as shown by the arrows in FIGS. 3(a), 3(b) and 3(c), in the edge portions 911 in the widthwise direction of the tracks 91A, 91B and 91C, a rotary magnetic field in which directions of in-plane direction are changed is formed like the regions surrounded by the circle L. Especially, in the boundary portions 912 of the tracks 91A, 91B and 91C, a rotary magnetic field with a large strength is generated like the regions surrounded by the circle L2. In addition, in this embodiment, in the boundary portion 912 of the track 91A and the track 91B adjacent to each other and in the boundary portion 912 of the track 91B and the track 91C, the "N"-pole and the "S"-pole in the boundary portion 912 are formed to contact directly with each other and thus a rotary magnetic field with a further larger strength is generated in the boundary portions 912 of the tracks 91A, 91B and 91C.

Therefore, in this embodiment, as shown in FIG. 2(c), the sensor face 250 of the magnetic sensor device 1 are faced oppositely to the boundary portions 912 of the tracks 91A, 91B and 91C. Further, the sensor face 250 is located at the center in the widthwise direction of the magnetic scale 9 and thus one end part 251 in the widthwise direction of the sensor face 250 is located at the center in the widthwise direction of the track 91A among three tracks 91A, 91B and 91C, and the other end part 252 is located at the center in the widthwise direction of the track 91C. Therefore, the region where the "+a" phase magnetic resistance pattern 25(+a) is formed and the region where the "+b" phase magnetic resistance pattern 25(+b) is formed are faced the boundary portion 912 of the tracks 91A and 91B, and the region where "−a" phase magnetic resistance pattern 25(−a) is formed and the region where the "−b" phase magnetic resistance pattern 25(−b) is formed are faced the boundary portion 912 of the tracks 91B and 91C. The track 91B is formed at the center of the magnetic scale 9 as a track where the respective regions are faced, i.e., the region where the "+a" phase magnetic resistance pattern 25(+a) and the "+b" phase magnetic resistance pattern 25(+b) are formed, and the region where the "−a" phase magnetic resistance pattern 25(−a) and the "−b" phase magnetic resistance pattern 25(−b) are formed, in other words, as a common track 91B for the respective regions.

(Structure of Magnetic Resistance Pattern)

Figure 4:
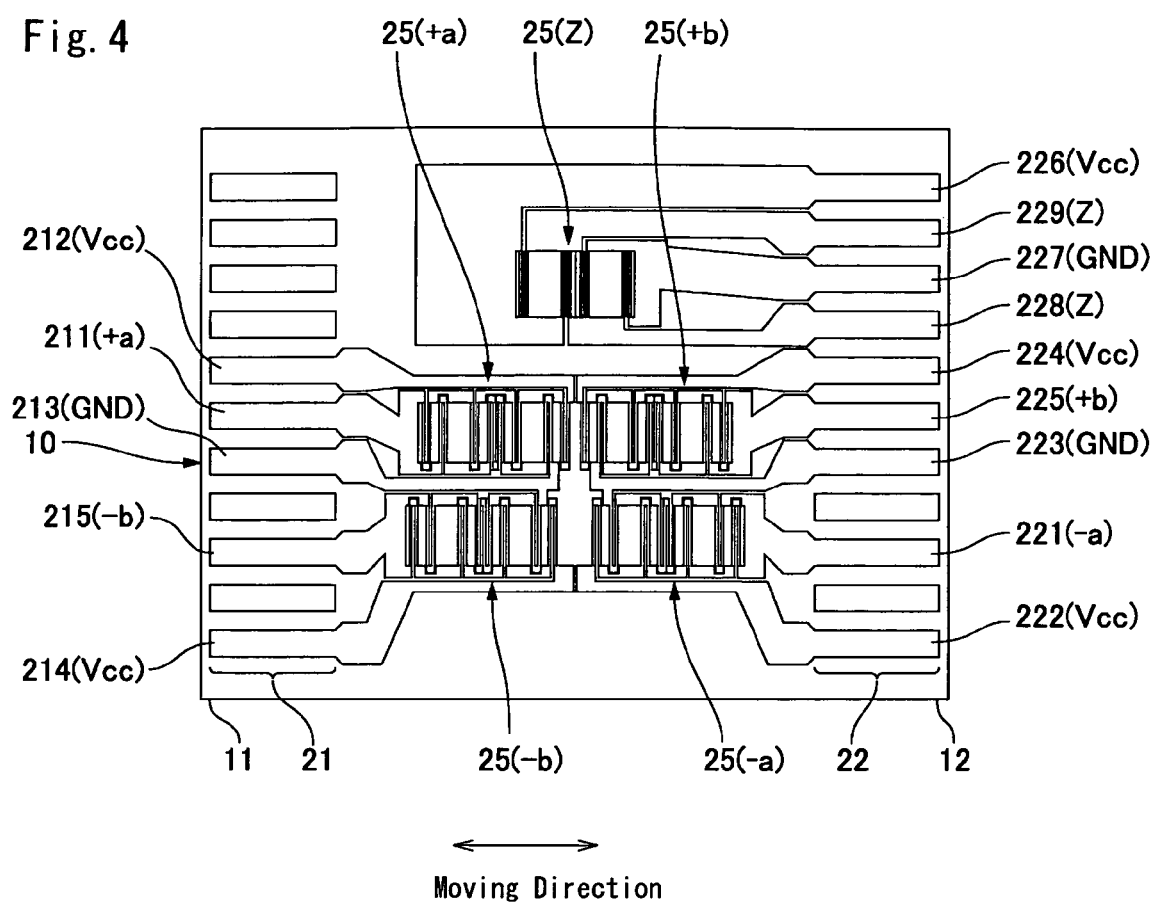
FIG. 4 is an explanatory view showing a magnetic resistance pattern which is formed in a magnetic sensor device in a magnetic type encoder device to which at least an embodiment of the present invention is applied.

In the magnetic sensor device 1 in this embodiment, the magnetic resistance patterns 25(+a), 25(−a), 25(+b) and 25(−b) are formed on a principal face of the rigid board 10 as shown in FIG. 4. These magnetic resistance patterns 25(+a), 25(−a), 25(+b) and 25(−b) structure bridge circuits shown in FIGS. 5(a) and 5(b).

As shown in FIG. 4, the magnetic resistance patterns 25(+a), 25(−a), 25(+b) and 25(−b) are formed at a center region in a longitudinal direction of the rigid board 10. One end part 11 of the rigid board 10 is structured to be a first terminal part 21 and the other end part 12 is structured to be a second terminal part 22.

In this embodiment, the "+a" phase magnetic resistance pattern 25(+a) and the "−a" phase magnetic resistance pattern 25(−a) are formed at diagonal positions and the "+b" phase magnetic resistance pattern 25(+b) and the "−b" phase magnetic resistance pattern 25(−b) are formed at diagonal positions.

Figure 5A:
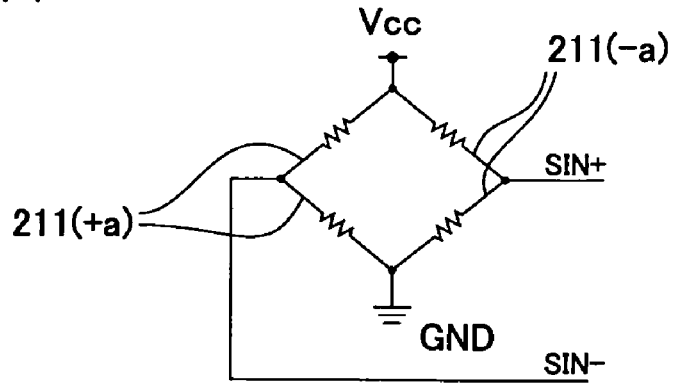
FIG. 5 is explanatory views showing an electric structure of the magnetic resistance pattern shown in FIG. 4.

Further, as shown in FIG. 4 and FIG. 5(a), one ends of the "+a" phase magnetic resistance pattern 25(+a) and the "−a" phase magnetic resistance pattern 25(−a) are connected to power supply terminals 212(Vcc) and 222(Vcc), and the other ends are connected to grand terminals 213(GND) and 223(GND) as a first common terminal and a second common terminal. Further, a terminal 211(+a) for an output SIN+ is connected to a midpoint position of the "+a" phase magnetic resistance pattern 25 (+a), and a terminal 221(−a) for an output SIN− is connected to a midpoint position of the "−a" phase magnetic resistance pattern 25(−a). Therefore, when the output SIN+ and the output SIN− are inputted into a subtracter, a differential output can be obtained and a moving speed of the magnetic scale 9 can be detected from the differential output.

Figure 5B:
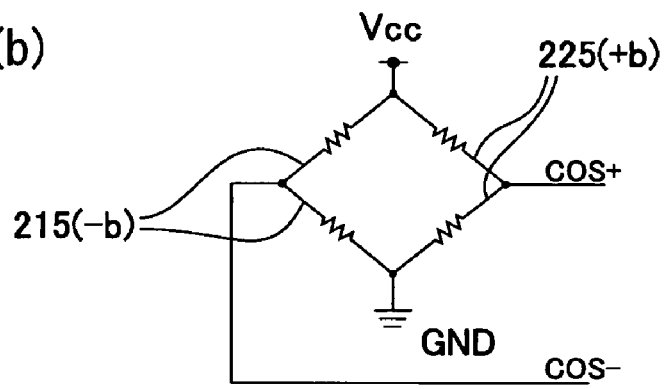

Similarly, as shown in FIG. 4 and FIG. 5(b), one ends of the "+b" phase magnetic resistance pattern 25(+b) and the "−b" phase magnetic resistance pattern 25(−b) are connected to power supply terminals 224(Vcc) and 214(Vcc). Further, the other end of the "−b" phase magnetic resistance pattern 25(−b) is, similarly to the "+a" phase magnetic resistance pattern 25(+a), connected to the ground terminal 213 as the first common terminal (GND), and the other end of the "+b" phase magnetic resistance pattern 25(+b) is, similarly to the "−a" phase magnetic resistance pattern 25(−a), connected to the ground terminal 223 as the second common terminal (GND). In addition, a terminal 225(+b) for an output COS+ is connected to a midpoint position of the "+b" phase magnetic resistance pattern 25(+b) and a terminal 215(−b) for an output COS− is connected to a midpoint position of the "−b" phase magnetic resistance pattern 25(−b). Therefore, when the output SIN+ and the output SIN− are inputted into a subtracter, a differential output can be obtained and a moving speed of the magnetic scale 9 can be detected from the differential output.

The first terminal part 21 is formed with dummy terminals in addition to the above-mentioned terminals. The second terminal part 22 is also formed with dummy terminals in addition to the above-mentioned terminal. Further, a "Z" phase magnetic resistance pattern 25(Z) for detecting a home position is formed at a center region in the longitudinal direction of the rigid board 10 and at a region adjacent to the above-mentioned magnetic resistance patterns. The second terminal part 22 is also formed with a power supply terminal 226(Vcc), a ground terminal 227(GND), output terminals 228(Z) and 229(Z) for the "Z" phase magnetic resistance pattern 25(Z).

In this embodiment, the magnetic resistance patterns 25(+a), 25(−a), 25(+b) and 25(−b) are made of magnetic member film such as ferromagnetic substance NiFe, which is formed on the principal face of the rigid board 10 by a semiconductor process, to structure a Wheatstone bridge. The respective terminals are made of an electrical conducting film which is simultaneously formed with the magnetic resistance patterns 25(+a), 25(−a), 25(+b) and 25(−b).

Figure 5C:
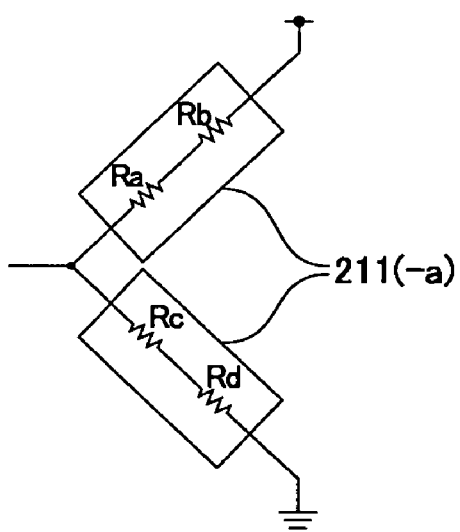
Figure 5D:
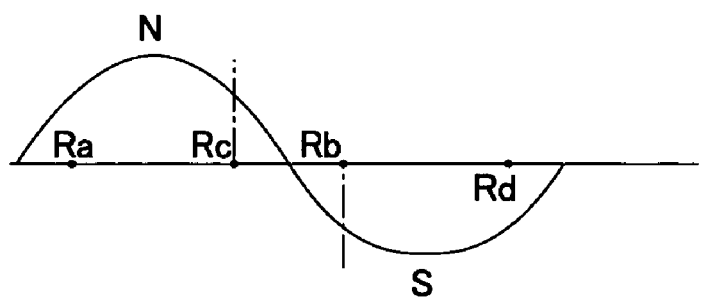

The magnetic resistance patterns 25(+a), 25(−a), 25(+b) and 25(−b) structured as described above are, as shown in FIG. 4, provided with narrow-width portions at predetermined positions in the moving direction. For example, as shown in FIG. 5(c), the magnetic resistance pattern 25(−a) can be represented as four resistors Ra through Rd. Resistance values of the four resistors Ra through Rd are varied corresponding to a phase change shown in FIG. 5(d). Therefore, phases of the resistors Ra and Rb are the same and the magnetic poles to be detected are opposite to each other. Further, phases of the resistors Rc and Rd are the same and the magnetic poles to be detected is opposite to each other. Further, the resistance values of the resistors Ra and Rb and the resistors Rc and Rd are varied with a phase difference of 180° and a differential output can be obtained.

(Structure of Rigid Board and its Periphery on Holder)

In this embodiment, in order to dispose the rigid board 10 within the holder 6 to structure the magnetic sensor device 1, a structure shown in FIG. 6 and FIG. 7 is utilized.

Figure 6A:
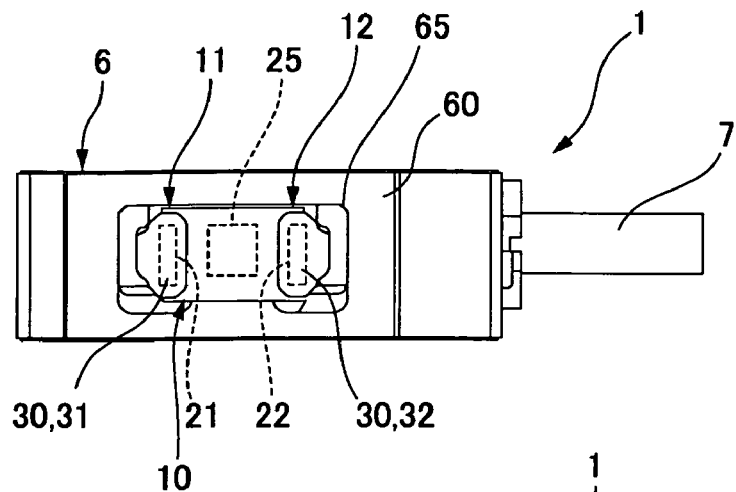
FIGS. 6(a), 6(b) and 6(c) are a bottom view showing the magnetic sensor device shown in FIG. 1, a longitudinal sectional view showing its essential portion, and an enlarged cross-sectional view showing a magneto-resistive element and its periphery.
Figure 6B:
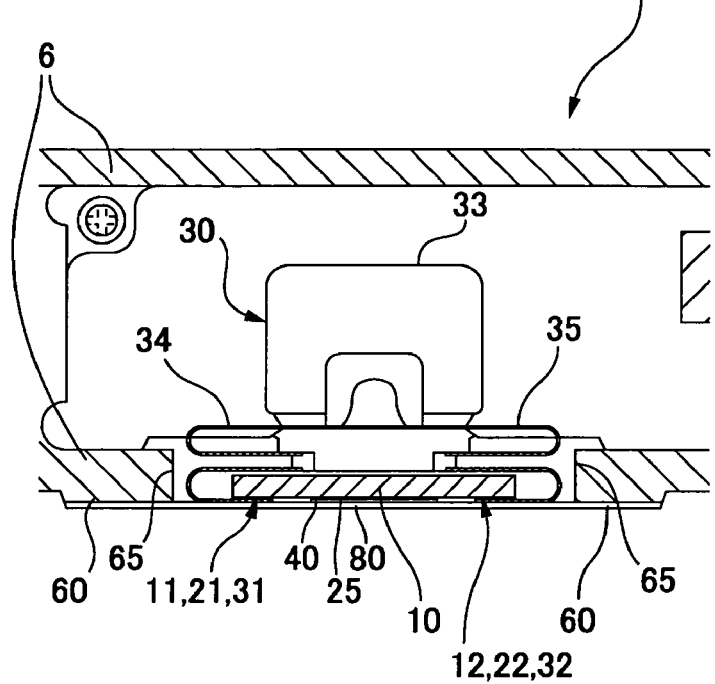
Figure 6C:
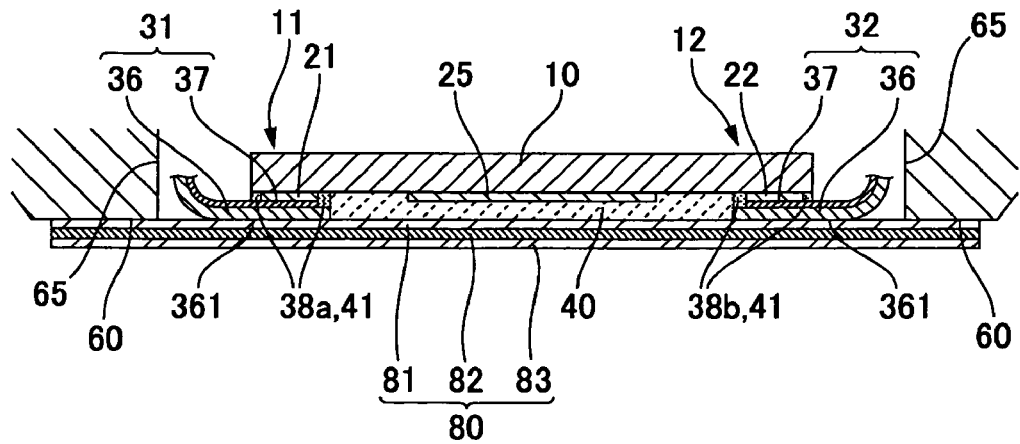
Figure 7A:
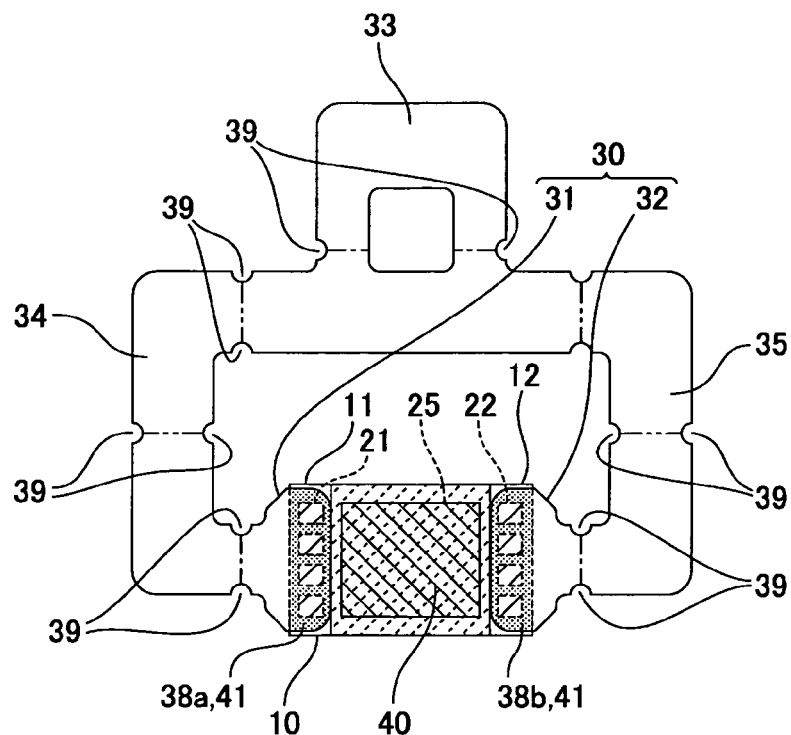
FIGS. 7(a), 7(b) and 7(c) are respectively a plan view showing a state that a flexible board is connected to a rigid board in a magnetic sensor device to which at least an embodiment of the present invention is applied, its longitudinal sectional view, and a cross-sectional view showing a state where a resin protective layer is formed on a rigid board.
Figure 7B:
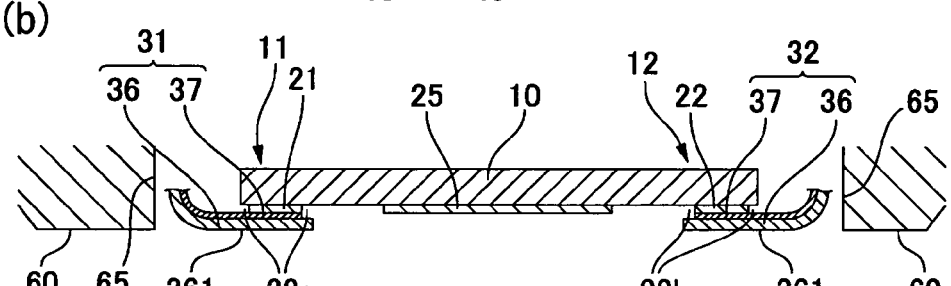
Figure 7C:
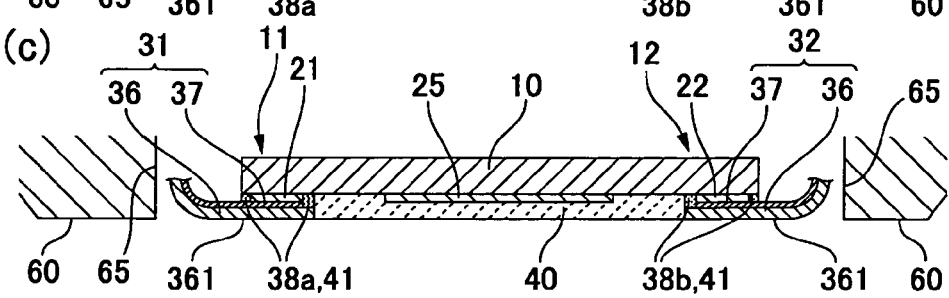

FIGS. 6(a), 6(b) and 6(c) are a bottom view showing the magnetic sensor device shown in FIG. 1, a longitudinal sectional view showing its essential portion, and an enlarged cross-sectional view showing a magneto-resistive element and its periphery. FIGS. 7(a), 7(b) and 7(c) are respectively a plan view showing a state that a flexible board is connected to the rigid board in the magnetic sensor device to which at least an embodiment of the present invention is applied, its longitudinal sectional view, and a cross-sectional view showing a state where a resin protective layer is formed on the rigid board.

In FIGS. 6(a), 6(b) and 6(c) and FIGS. 7(a) and 7(b), in the magnetic sensor device 1 in this embodiment, a first flexible board 31 is connected to a first end part 11 of the rigid board 10. End parts of electrical conduction patterns 37 (signal line) which are formed on a base film 36 in the first flexible board 31 are connected to the respective terminals in the first terminal part 21 by a method such as solder joining, alloy joining or joining by using an anisotropic electrical conducting film or the like.

Further, a second flexible board 32 is connected to the other end part, i.e., a second end part 12 of the rigid board 10. End parts of electrical conduction patterns 37 (signal line) which are formed on the base film 36 in the second flexible board 32 are connected to the respective terminals in the second terminal part 22 by a method such as solder joining, alloy joining or joining by using an anisotropic electrical conducting film or the like. In the first flexible board 31 and the second flexible board 32, metal plating of Sn—Cu system is formed on portions for being joined to the respective terminals in the first terminal part 21 and the second terminal part 22 of the electrical conduction patterns 37 which are formed on the base film 36.

In this embodiment, as shown in FIG. 7(a), the first flexible board 31 and the second flexible board 32 are structured as a part of one piece of a flexible board 30. In other words, the flexible board 30 is provided with a rectangular part 33 for being connected with the cable 7 shown in FIG. 1, and a pair of extended portions 34 and 35 which are formed in a U-shape and extended to both the right and left sides from an underside edge of the rectangular part 33. The first flexible board 31 is structured of a first extended part 34 and the second flexible board 32 is structured of a second extended part 35. Therefore, a thickness of the base film 36 and a thickness of the electrical conduction pattern 37 are the same in the first flexible board 31 and the second flexible board 32. Further, the flexible board 30 is formed to be bilaterally symmetrical with each other and the first flexible board 31 and the second flexible board 32 are formed in the same planar shape as each other.

In this embodiment, both side edges in the widthwise direction of a pair of the extended portions 34 and 35 in the flexible board 30 are formed with a plurality of small cut-out parts 39 formed in a semicircular shape. In a state that the portions where the cut-out parts 39 are formed are folded as a valley-folded portion (shown by the alternate long and short dash line) and a ridge-folded portion (shown by the two-dot chain line), as shown in FIGS. 6(b) and 6(c) and FIGS. 7(b) and 7(c), the flexible board 30 and the rigid board 10 are disposed on the bottom face of the holder 6 while the principal face of the rigid board 10 is directed to the outer side (downward).

In the magnetic sensor device 1 structured as described above, as shown in FIG. 6(c), the surface of the magneto-resistive element 25 is, for example, covered with an insulating resin layer 40, a conductive adhesion material layer 81, a nonmagnetic metal layer 82 and a resin protection layer 83. The metal layer 82 is adhesively bonded and fixed to the holder 6 through the conductive adhesion material layer 81. Therefore, the metal layer 82 is electrically connected to the holder 6 through the conductive adhesion material layer 81 and the metal layer 82 functions as an electrically conductive layer for radio wave shielding which covers the surface of the magneto-resistive element 25. The resin protection layer 83, the metal layer 82 and the conductive adhesion material layer 81 are structured by means of that the resin protection layer 83 and the conductive adhesion material layer 81 are respectively laminated on both faces of the metal layer 82 which is made of aluminum foil, copper foil or the like to structure a film 80, which is adhesively bonded and fixed to the holder 6 through the conductive adhesion material layer 81. Alternatively, the resin protection layer 83, the metal layer 82 and the conductive adhesion material layer 81 are structured by means of that the metal layer 82 made of aluminum film, copper film or the like and the conductive adhesion material layer 81 are laminated on a surface of the resin protection layer 83 which is made of film base material such as PET to structure the film 80, which is adhesively bonded and fixed to the holder 6 through the conductive adhesion material layer 81. The conductive adhesion material layer 81 is structured such that carbon particles, aluminum particles, silver particles, copper particles or the like are dispersed into various adhesion materials. A thickness of the film 80 is about 50 μm and is extremely thin. Therefore, a gap between the magneto-resistive element 25 and the magnetic scale 9 can be narrowed less than 300 μm. The resin protection layer 83 may be preferably formed from a viewpoint to protect the metal layer 82 when contacted with a movable member but the resin protection layer 83 may be omitted according to kinds or used modes of metal which structures the metal layer 82. In this embodiment, the magneto-resistive element 25 provided in the magnetic sensor device 1 and the magnetic type encoder device 100 may utilize the magneto-resistive element 25 which is provided with the same characteristic as the magneto-resistance curve (MR characteristic) shown in FIG. 15 in the second embodiment and thus its detailed description is omitted.

A manufacturing method for the magnetic sensor device 1 which is structured as described above will be described in detail below with reference to FIGS. 6(a), 6(b) and 6(c) and FIGS. 7(a), 7(b) and 7(c) and a further structure of the magnetic sensor device 1 will be also described below.

In this embodiment, first, the magneto-resistive element 25, the first terminal part 21 and the second terminal part 22 are formed on the principal face of the rigid board 10 by a semiconductor process. After that, the first flexible board 31 is connected to the first end part 11 of the rigid board 10 and the second flexible board 32 is connected to the second end part 12 of the rigid board 10.

Next, sealing resin 41 such as epoxy resin is filled into gap spaces 38a and 38b. The gap spaces 38a and 38b are formed between the principal face of the rigid board 10 and the first flexible board 31 and between the principal face of the rigid board 10 and the second flexible board 32 due to portions where the electrical conduction patterns are not formed in the flexible board 30 and due to portions where the terminals are not formed in the rigid board 10. Alternatively, when an anisotropic electrical conducting film is used for joining the first flexible board 31 and the second flexible board 32 to the rigid board 10, the gap spaces can be filled with its resin portion and thus filling of resin separately into the gap spaces is not required.

Next, the flexible board 30 is folded along the valley-folding portions shown by the alternate long and short dash line in FIG. 7(a) and along the ridge-folding portions shown by the two-dot chain line and then, as shown in FIG. 7(b), the principal face of the rigid board 10 is directed to the outer side (downward) and the flexible board 30 and the rigid board 10 are disposed on the bottom part within the holder 6. In this case, in the first flexible board 31 and the second flexible board 32, the rigid board 10, the first flexible board 31 and the second flexible board 32 are fixed within the holder 6 so that a rear face portion 361 of the base film 36 which is connected to the rigid board 10 is coincided with the reference face 60 of the holder 6.

Next, as shown in FIG. 7(c), resin such as epoxy resin is filled on the principal face of the rigid board 10 in a region sandwiched by the first flexible board 31 and the second flexible board 32 and then is hardened. As a result, the insulating resin layer 40 which covers the magneto-resistive element 25 is formed as shown by the right-upward slant dotted line in FIG. 7(a). In this case, resin may be filled into a gap space between the first flexible board 31 and the second flexible board 32 and the opening part 65 of the holder 6. Fixing of the rigid board 10 to the holder 6 is completed in the magnetic sensor device 1 through the above-mentioned steps.

Next, as shown in FIG. 6(c), the film 80 in which the resin protection layer 83, the metal layer 82 and the conductive adhesion material layer 81 are formed in this order is stuck so that the conductive adhesion material layer 81 is directed to the reference face 60.

In this manner, in this embodiment, the surface of the magneto-resistive element 25 is covered with the insulating resin layer 40, the conductive adhesion material layer 81, the metal layer 82 and the resin protection layer 83, and the metal layer 82 is adhesively fixed to the holder 6 through the conductive adhesion material layer 81. Therefore, the metal layer 82 is electrically connected to the holder 6 through the conductive adhesion material layer 81. According to the above-mentioned steps, in the magnetic sensor device 1, the surface of the magneto-resistive element 25 can be covered with an electrically conducting layer for radio wave shielding which is comprised of the metal layer 82.

Main Effects of First Embodiment

As described above, in the magnetic sensor device 1 in this embodiment, the "+a" phase magnetic resistance pattern 25(+a) and the "−a" phase magnetic resistance pattern 25(−a) are located at diagonal positions each other, and the "+b" phase magnetic resistance pattern 25(+b) and the "−b" phase magnetic resistance pattern 25(−b) are located at diagonal positions each other. Therefore, four phase magnetic resistance patterns 25(+a), 25(−a), 25(+b) and 25(−b) can be drawn in the same face and thus all of the magnetic resistance patterns 25(+a) and 25(−a) structuring "A"-phase and the magnetic resistance patterns 25(+b) and 25(−b) structuring "B"-phase can be formed on the same face of one piece of the rigid board 10. Accordingly, all the magnetic resistance patterns 25(+a), 25(−a), 25(+b) and 25(−b) can be structured with equal sensitivity and thus, even when a gap space dimension between the sensor face 250 and the magnetic scale 9 is varied, offset does not vary and a high degree of interpolation precision can be obtained. As a result, at the time of assembling, even when the sensor face 250 comprised of the lower end faces of the "A"-phase magnetic resistance pattern 25(A) and the "B"-phase magnetic resistance pattern 25(B) (respective pattern faces oppositely facing the magnetic scale 9) is inclined with respect to the magnetic scale 9, an adverse effect to the interpolation precision can be suppressed. Further, drawing of the magnetic resistance patterns 25(+a), 25(−a), 25(+b) and 25(−b) is easy and thus many patterns for high frequency cancellation can be arranged.

Further, in the magneto-resistive element 25 in this embodiment, the "+a" phase magnetic resistance pattern 25(+a) and the "−a" phase magnetic resistance pattern 25(−a) are located at diagonal positions each other, and the "+b" phase magnetic resistance pattern 25(+b) and the "−b" phase magnetic resistance pattern 25(−b) are located at diagonal positions each other. Therefore, all of the magnetic resistance patterns 25(+a) and 25(−a) structuring "A"-phase and the magnetic resistance patterns 25(+b) and 25(−b) structuring "B"-phase can be formed on the same face of one piece of the rigid board 10. Accordingly, even when compared with a conventional magnetic sensor device in which, for example, two sets of magneto-resistive elements are used in which respective magnetic resistance patterns of the "+a" phase magnetic resistance pattern, the "−a" phase magnetic resistance pattern, the "+b" phase magnetic resistance pattern and the "−b" phase magnetic resistance pattern are formed in the same direction and are linearly arranged and, in which the two sets of the magneto-resistive elements are used in a parallel state, a high degree of detection accuracy with the same level as the above-mentioned conventional example can be obtained and a space for mounting the magneto-resistive element 25 in the magnetic sensor device 1 can be reduced and, as a result, the size of the magnetic sensor device 1 can be also reduced.

Further, the other end of the "−b" phase magnetic resistance pattern 25(−b) is, similarly to the "+a" phase magnetic resistance pattern 25(+a), connected to the ground terminal 213 (GND) as the first common terminal, and the other end of the "+b" phase magnetic resistance pattern 25(+b) is, similarly to the "−a" phase magnetic resistance pattern 25(−a), connected to the ground terminal 223 (GND) as the second common terminal. Therefore, the magnetic resistance patterns in different phases can be formed nearer to each other on the rigid board 10 and thus detection accuracy can be improved.

Further, in this embodiment, all of the magnetic resistance patterns 25(+a) and 25(−a) structuring "A"-phase and the magnetic resistance patterns 25(+b) and 25(−b) structuring "B"-phase can be formed on the same face of one piece of the rigid board 10. Therefore, when a face of the rigid board 10 where the magnetic resistance patterns 25(+a), 25(−a), 25(+b) and 25(−b) are formed is directed to the side of the magnetic scale 9, a gap space dimension between the magnetic resistance pattern 25(+a), 25(−a), 25(+b) and 25(−b) and the magnetic scale 9 can be narrowed. Accordingly, in the magnetic type linear encoder device 100, the rotary magnetic fields which are formed in the boundary portions 912 between the adjacent tracks 91A, 91B and 91C in the magnetic scale 9 can be detected with the magnetic sensor device 1 and, on the basis of the result, a relative moving speed or a relative moving distance to the magnetic scale 9 can be detected. In this case, a sine wave with a high degree of waveform quality can be obtained from the magnetic sensor device 1 and it is strong to disturbance magnetic fields and thus, features of a rotary magnetic field detection type can be maximally exhibited. Moreover, since the saturated sensitivity region is utilized, a high degree of detection sensitivity can be obtained without being affected by manufacturing dispersion of the magneto-resistive element 25.

Further, in this embodiment, the sensor face 250 of the magnetic sensor device 1 is oppositely faced the boundary portions 912 of the tracks 91A, 91B and 91C to detect a rotary magnetic field. Therefore, different from a case in which the sensor face 250 is perpendicularly directed to the magnetic scale 9, a state where a magnetic field does not reach to a saturated sensitivity region at a position apart from the magnetic scale 9 can be avoided. Accordingly, a detection accuracy of the magnetic type encoder device 1 can be improved.

Further, the boundary portion 912 between the adjacent tracks 91A and track 91B and the boundary portion 912 between the track 91B and track 91C in the magnetic scale 9 in this embodiment are formed so that the "N"-pole and the "S"-pole adjacent to each other of the boundary portion 912 are directly contacted with each other without, for example, interposing a non-magnetized portion where a magnetic pole is not present or a nonmagnetic portion. In addition, the boundary portion 912 between the adjacent tracks 91A and track 91B and the boundary portion 912 between the track 91B and track 91C in the magnetic scale 9 in this embodiment are formed so that the "N"-pole and the "S"-pole adjacent to each other of the boundary portion 912 are directly contacted with each other. Therefore, a rotary magnetic field with a further larger strength can be generated in the boundary portions 912 of the tracks 91A, 91B and 91C.

Further, the track 91B is formed as a track which oppositely faces the region where the "+a" phase magnetic resistance pattern 25(+a) and the "+b" phase magnetic resistance pattern 25(+b) are formed and the region where the "−a" phase magnetic resistance pattern 25(−a) and the "−b" phase magnetic resistance pattern 25(−b) are formed, in other words, the track 91B is formed as the common track 91B to be used for the both regions at the center of the magnetic scale 9 and thus the size of the magnetic scale 9 can be reduced. Further, since magnetizing number of times of "N"-pole and "S"-pole to the tracks can be reduced and thus manufacturing of the magnetic scale 9 can be simply performed at a low cost.

In this embodiment, the end parts 251 and 252 in the widthwise direction of the sensor face 250 are respectively located at a center in the widthwise direction of the tracks 91A and 91C. However, a structure may be adopted in which a width dimension of the sensor face 250 is wider than a width dimension of the magnetic scale 9 and the end parts 251 and 252 of the sensor face 250 are protruded on the outer side in the widthwise direction of the magnetic scale 9.

Modified Examples of First Embodiment

Figure 8:
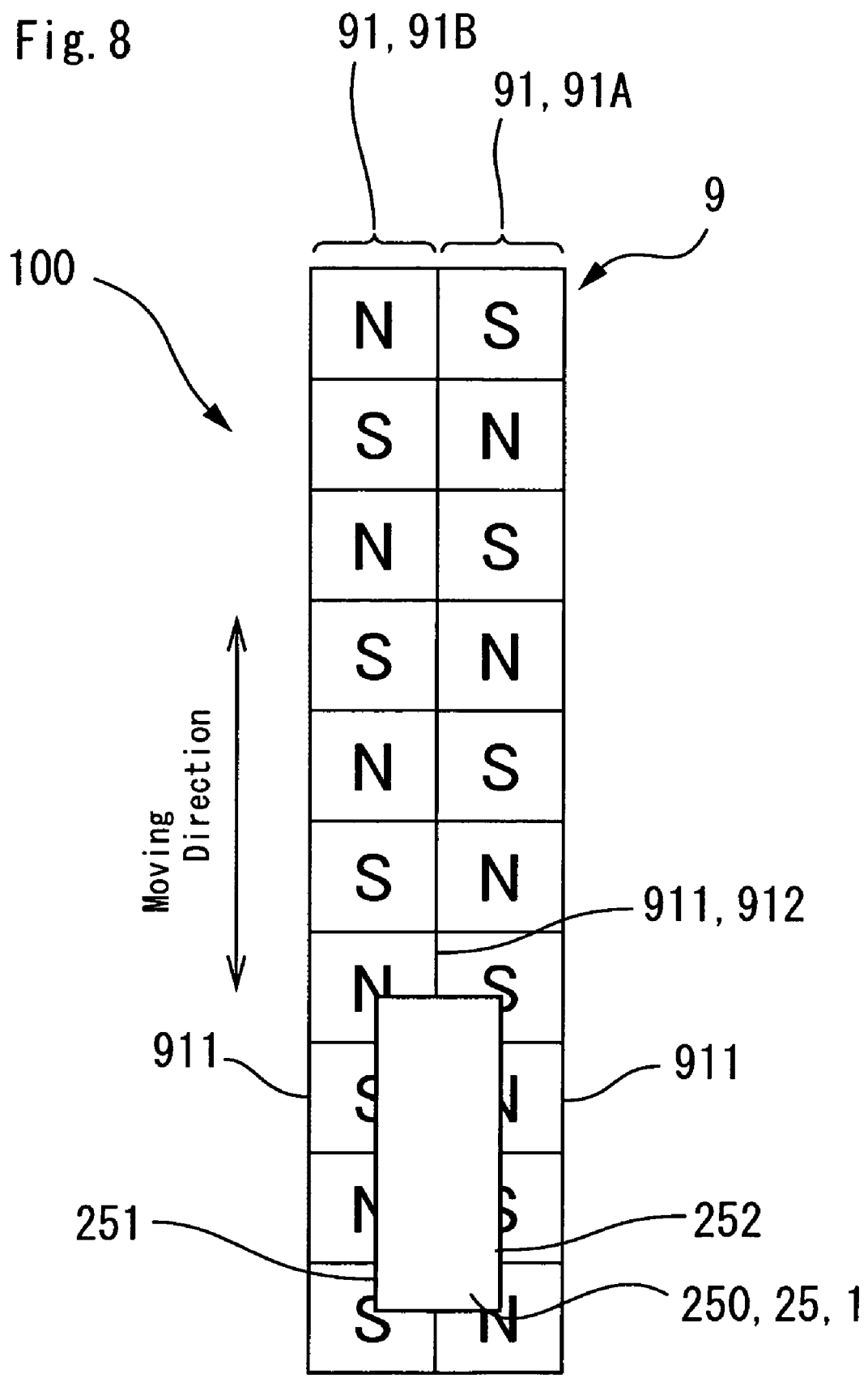
FIG. 8 is an explanatory view showing another magnetic type encoder device to which at least an embodiment of the present invention is applied.
Figure 9A:
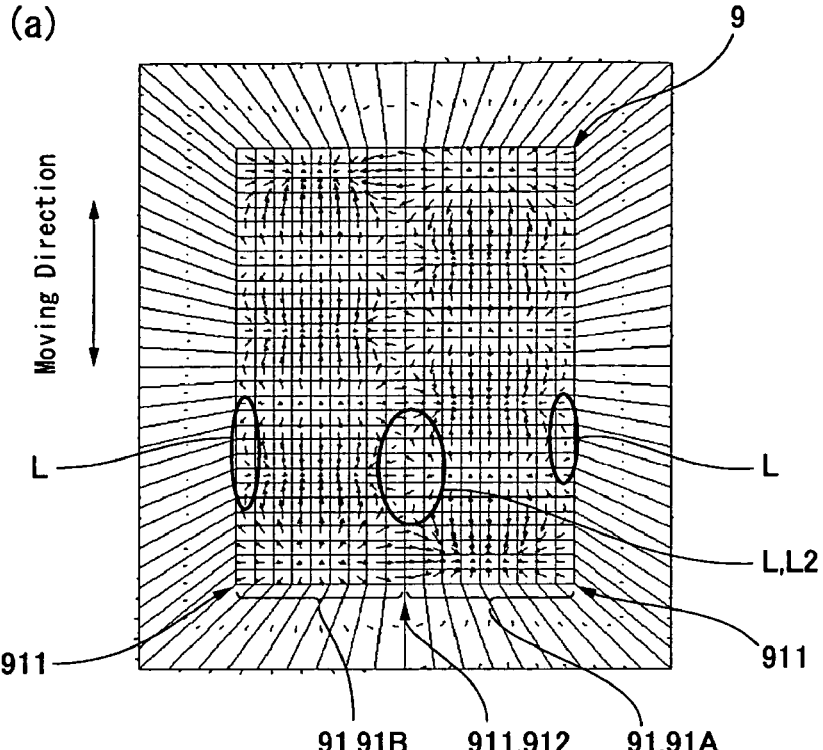
FIGS. 9(a), 9(b) and 9(c) are an explanatory plan view showing directions of magnetic fields formed in a magnetic scale in the magnetic type encoder device shown in FIG. 8, its explanatory oblique view and its explanatory side view.
Figure 9B:
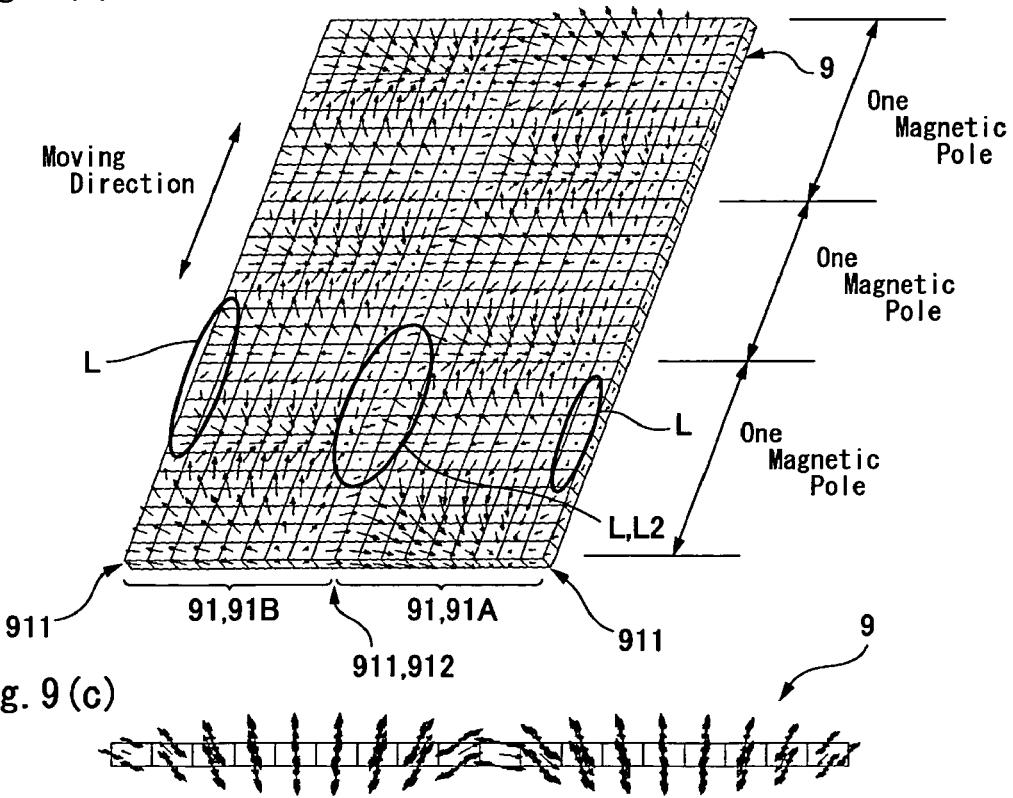
Figure 9C:
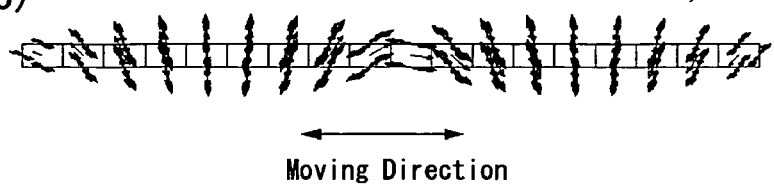

In the embodiment described above, the number of tracks is three in lines but, as shown in FIG. 8, in a case of two lines of track 91 (91A and 91B), when directions of in-plane direction of the magnetic field in the magnetic scale 9 are obtained by magnetic field analysis for every matrix-shaped minute region, as shown by arrows in FIGS. 9(a), 9(b) and 9(c), in the edge portions 911 in the widthwise direction of the tracks 91A and 91B, a rotary magnetic field in which the direction of in-plane direction is changed is formed like regions surrounded by the circle L and, especially, a rotary magnetic field with a larger strength is generated in the boundary portion 912 of the tracks 91A and 91B like a region surrounded by the circle L2. In addition, in this embodiment, the boundary portion 912 between the track 91A and track 91B adjacent to each other is formed so that the "N"-pole and the "S"-pole of the boundary portion 912 are directly contacted with each other and thus a rotary magnetic field with a further larger strength is generated in the boundary portion 912 between the tracks 91A and 91B. Therefore, at least an embodiment of the present invention may be applied to a magnetic type encoder device in which a magnetic scale 9 with the number of the track is two in lines is used. Further, the boundary portion 912 between the track 91A and track 91B adjacent to each other is formed so that the "N"-pole and the "S"-pole adjacent to each other of the boundary portion 912 are directly contacted with each other, for example, without interposing a non-magnetized portion where a magnetic pole is not present or without interposing a nonmagnetic portion.

Figure 11A:
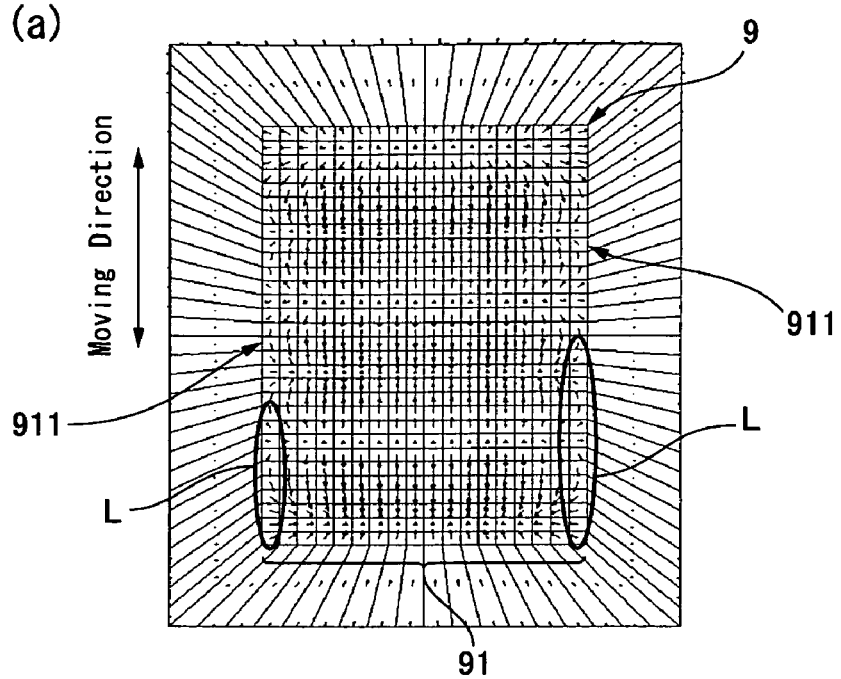
FIGS. 11(a), 11(b) and 11(c) are an explanatory plan view showing directions of magnetic fields formed in a magnetic scale in the magnetic type encoder device shown in FIG. 10, its explanatory oblique view and its explanatory side view.
Figure 11B:
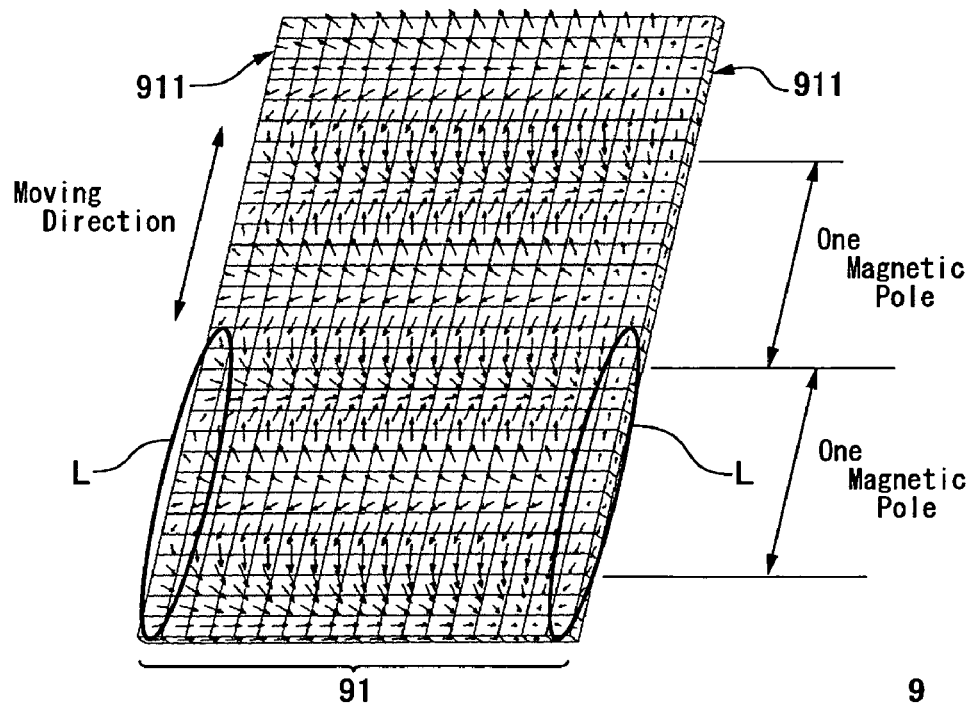
Figure 11C:
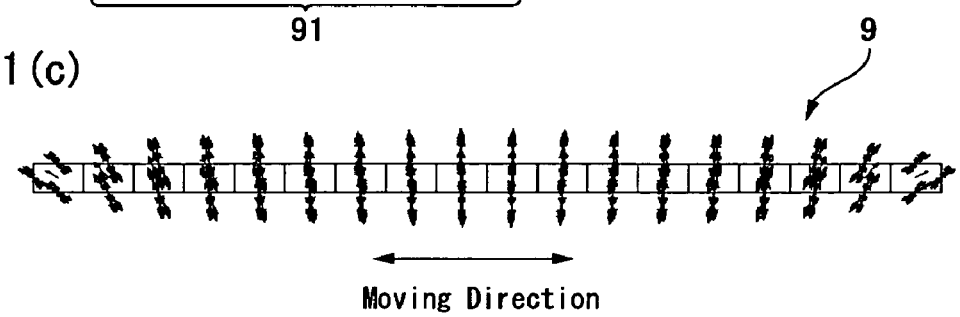

In addition, as shown in FIG. 10, in a case that the number of track is one in line, when directions of in-plane direction of magnetic fields in the magnetic scale 9 are obtained by magnetic field analysis for every matrix-shaped minute region, as shown by the arrows in FIGS. 11(a), 11(b) and 11(c), a rotary magnetic field in which a direction of in-plane direction is changed is formed at edge portions 911 in the widthwise direction of the track 91 as shown in the region surrounded by the circle L. Therefore, at least an embodiment of the present invention may be applied to a magnetic type encoder device in which a magnetic scale 9 whose number of track is one in line is used.

Figure 12:
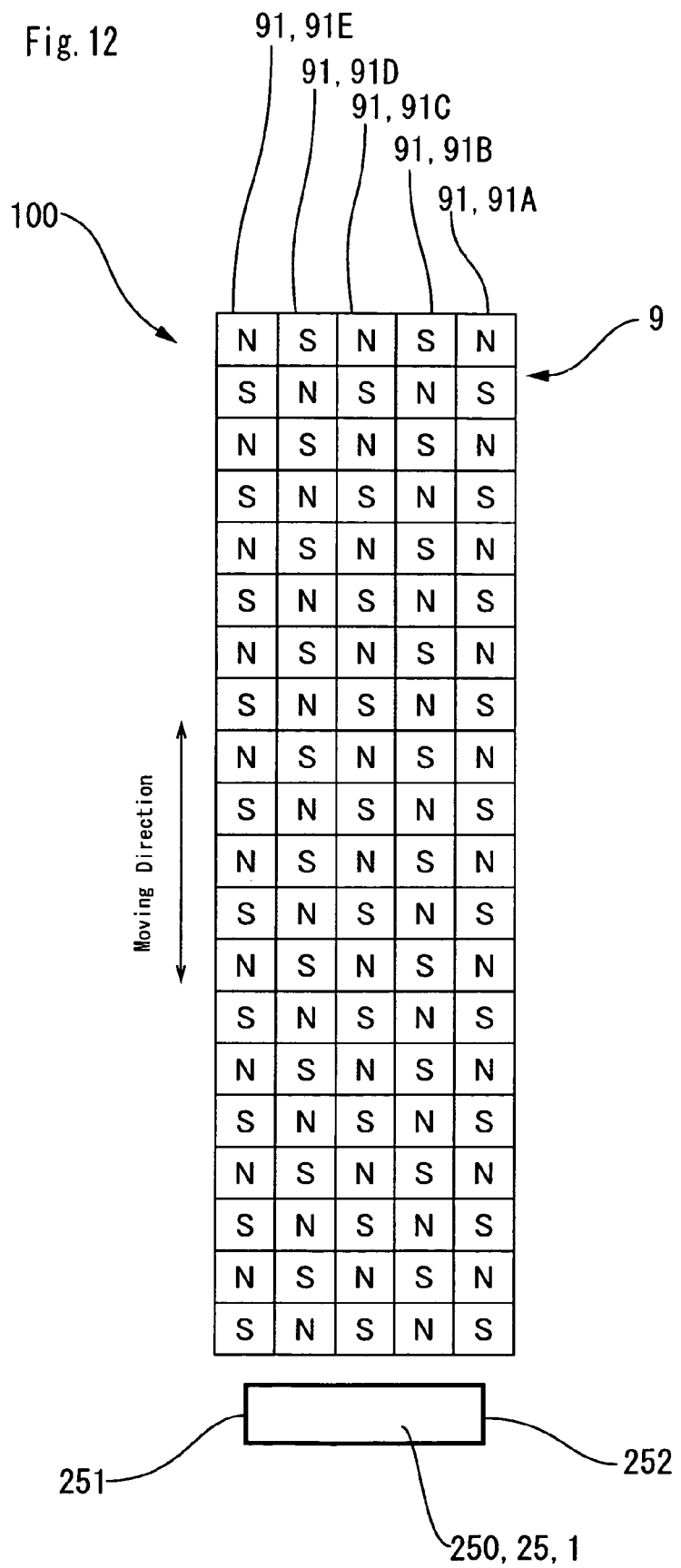
FIG. 12 is an explanatory view showing another magnetic type encoder device to which at least an embodiment of the present invention is applied.

In addition, as shown in FIG. 12, a structure may be employed in which a sensor face 250 faces tracks 91A, 91B,

91C, 91D and 91E in five lines and positions of "N"-pole and "S"-pole in a moving direction are coincided with each other at the tracks 91A and 91E where both end portions of the sensor face 250 are faced. Further, a boundary portion between the track 91A and the track 91B adjacent to each other, a boundary portion between the track 91B and the track 91C, a boundary portion between the track 91C and the track 91D and a boundary portion between the track 91D and the track 91E are respectively formed so that "N"-pole and "S"-pole in the boundary portion are directly contacted with each other and thus a rotary magnetic field having a further larger strength can be generated in the respective boundary portions of the tracks 91A, 91B, 91C, 91D and 91E. Further, it is preferable that "N"-pole and "S"-pole adjacent to each other of the boundary portions are formed to be directly contacted with each other in the respective boundary portions of the tracks 91A, 91B, 91C, 91D and 91E, for example, without interposing a non-magnetized portion where a magnetic pole is not present or without interposing a nonmagnetic portion. When structured as described above, a rotary magnetic field with a further larger strength can be generated.

[Structure of Another Magnetic Type Encoder Device in First Embodiment]

Figure 13A:
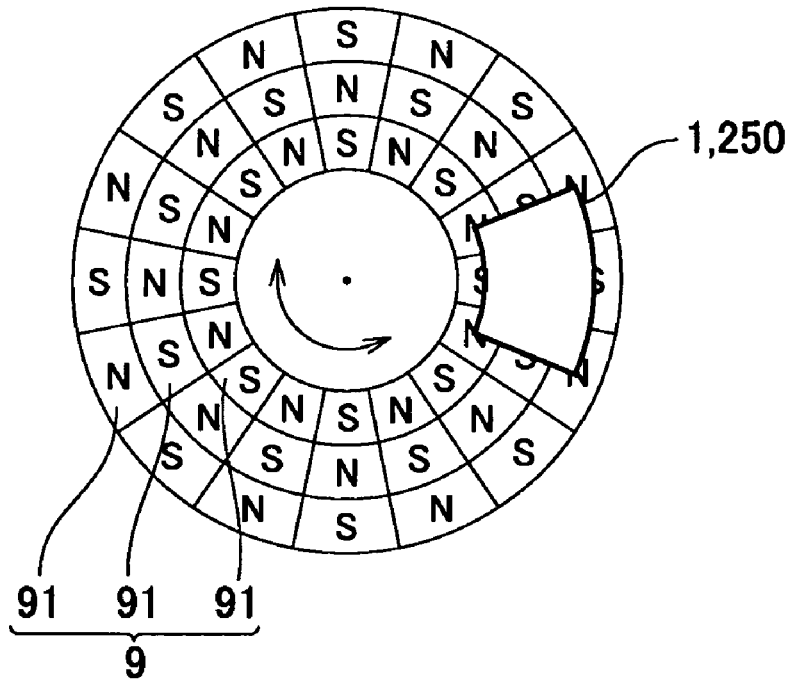
FIGS. 13(a) and 13(b) are explanatory views when a rotary encoder is structured by utilizing a magnetic type encoder device to which at least an embodiment of the present invention is applied.
Figure 13B:
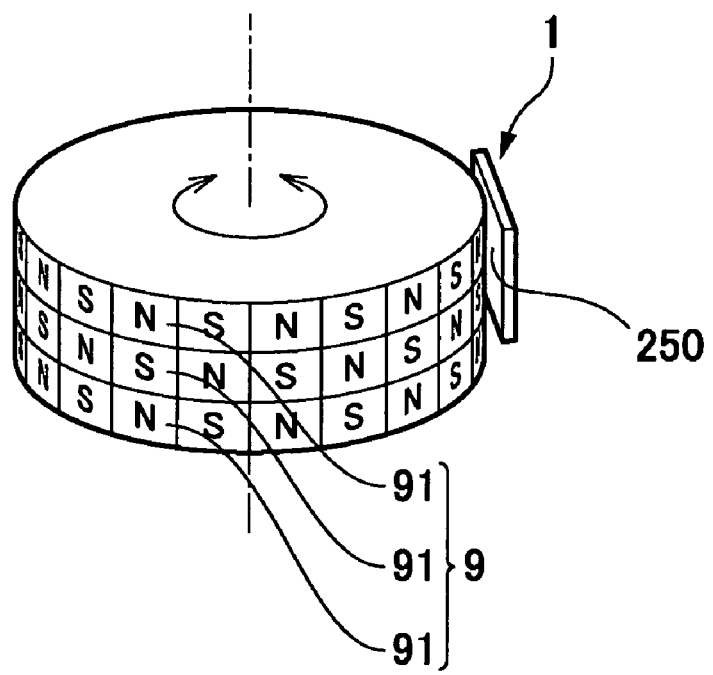

All of the embodiments described above are examples in which a magnetic type encoder device is structured as a linear encoder. However, as shown in FIGS. 13(*a*) and 13(*b*), a rotary encoder may be structured. In this case, as shown in FIG. 13(*a*), a magnetic scale 9 is structured on an end face of a rotation body so that tracks 91 are extended in a circumferential direction, and a sensor face 250 of a magnetic sensor device 1 is oppositely faced to the tracks 91. Further, as shown in FIG. 13(*b*), a magnetic scale 9 is structured on an outer peripheral face of a rotation body so that tracks 91 are extended in a circumferential direction, and a sensor face 250 of a magnetic sensor device 1 is oppositely faced to the tracks 91.

Further, in the embodiment described above, the magnetic sensor device 1 in accordance with at least an embodiment of the present invention is used in a magnetic type encoder device in which directions of a rotary magnetic field are detected in a magnetic field intensity more than a saturation sensitivity region. However, the magnetic sensor device 1 may be used in a magnetic type encoder device in which a position is detected on the basis of the strength of a magnetic field in a fixed direction. Further, it can be structured as a type in which directions of a rotary magnetic field are detected in a magnetic field intensity of a region other than a saturation sensitivity region.

Second Embodiment

A magnetic type encoder device, a magnetic scale and a manufacturing method for a magnetic scale to which at least an embodiment of the present invention is applied will be described below with reference to the accompanying drawings.

First Example of Second Embodiment (Entire Structure of Magnetic Type Encoder Device)

Figure 14A:
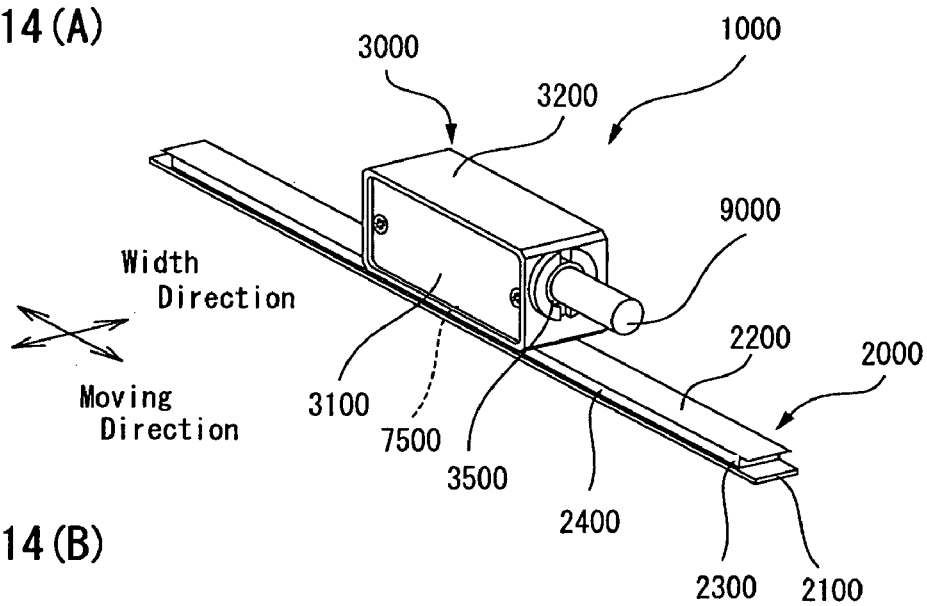
FIGS. 14(A) and 14(B) are respectively an explanatory view showing a structure of a magnetic type encoder device to which at least an embodiment of the present invention is applied, and an explanatory view showing a positional relationship between a permanent magnet and a magneto-resistive element in a magnetic type encoder device in accordance with a first example of a second embodiment in at least an embodiment of the present invention.
Figure 14B:
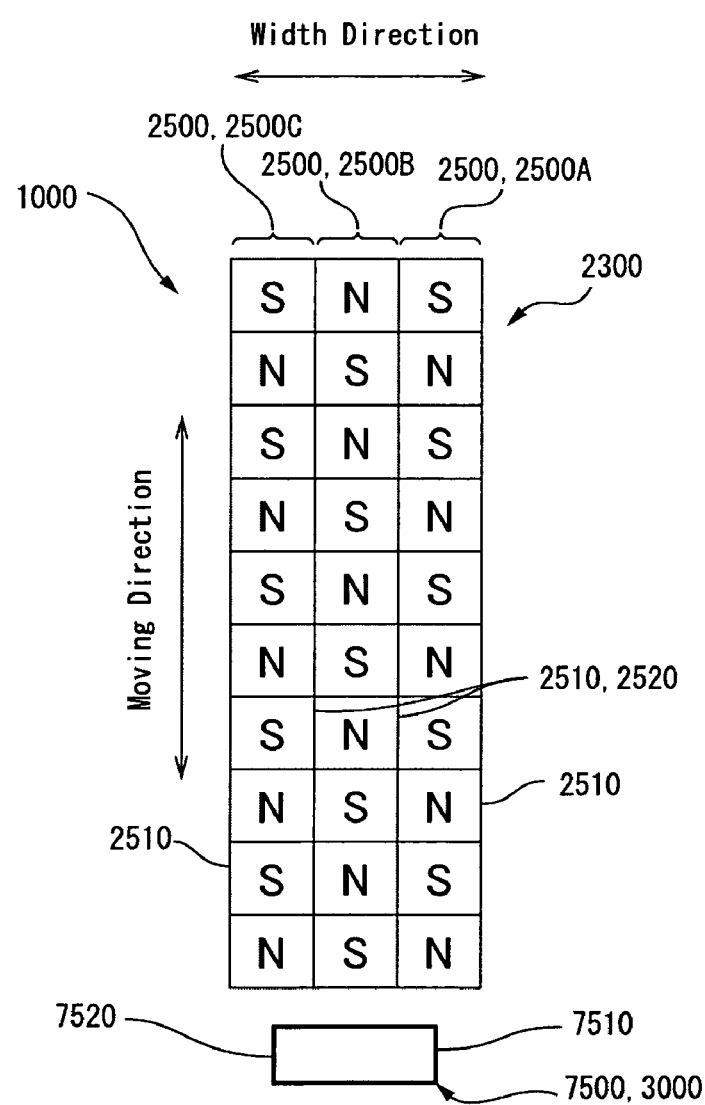

FIGS. 14(A) and 14(B) are respectively an explanatory view showing a structure of a magnetic type encoder device to which at least an embodiment of the present invention is applied, and an explanatory view showing a positional relationship between a permanent magnet and a magneto-resistive element in a magnetic type encoder device in accordance with a first example in a second embodiment of the present invention.

A magnetic type encoder device 1000 shown in FIG. 14(A) is a linear encoder in which a magnetic scale 2000 having a permanent magnet 2300 extended in a band-like shape is oppositely faced to a bottom face (sensor face) of a magnetic sensor device 3000. The permanent magnet 2300 is provided with a track where an "N"-pole and an "S"-pole are alternately arranged along a longitudinal direction (relative moving direction of the magnetic sensor device 3000 to the permanent magnet 2300) as described below. The magnetic sensor device 3000 is, for example, provided with a holder 3200 comprised of an aluminum die-casting product in a substantially rectangular parallelepiped shape, a rectangular cover 3100 which covers an opening of the holder 3200, and a cable 9000 which is extended from the holder 3200. A cable through hole 3900 is formed in a side face of the holder 3200 and the cable 9000 is drawn out through the cable through hole 3900. Further, a magneto-resistive element 7500 is disposed in the holder 3200 at a position oppositely facing to the magnetic scale 2000. Therefore, the magnetic sensor device 3000 and the permanent magnet 2300 (magnetic scale 2000) are relatively moved in the longitudinal direction of the permanent magnet 2300 and, as a result, the relative position and relative speed can be detected. Accordingly, for example, in a machine tool or a mounting device, when one of the magnetic scale 2000 and the magnetic sensor device 3000 is disposed in a fixed body side and the other is disposed in a movable body side, a moving speed and a moving distance of a movable body to a fixed body can be detected. In this embodiment, the magnetic scale 2000 or the magnetic sensor device 3000 is moved in the longitudinal direction and thus the longitudinal direction of the magnetic scale 2000 is referred to as a moving direction and a short side direction of the magnetic scale 2000 is referred to as a width direction.

(Structure of Magnetic Sensor Device)

Figure 15:
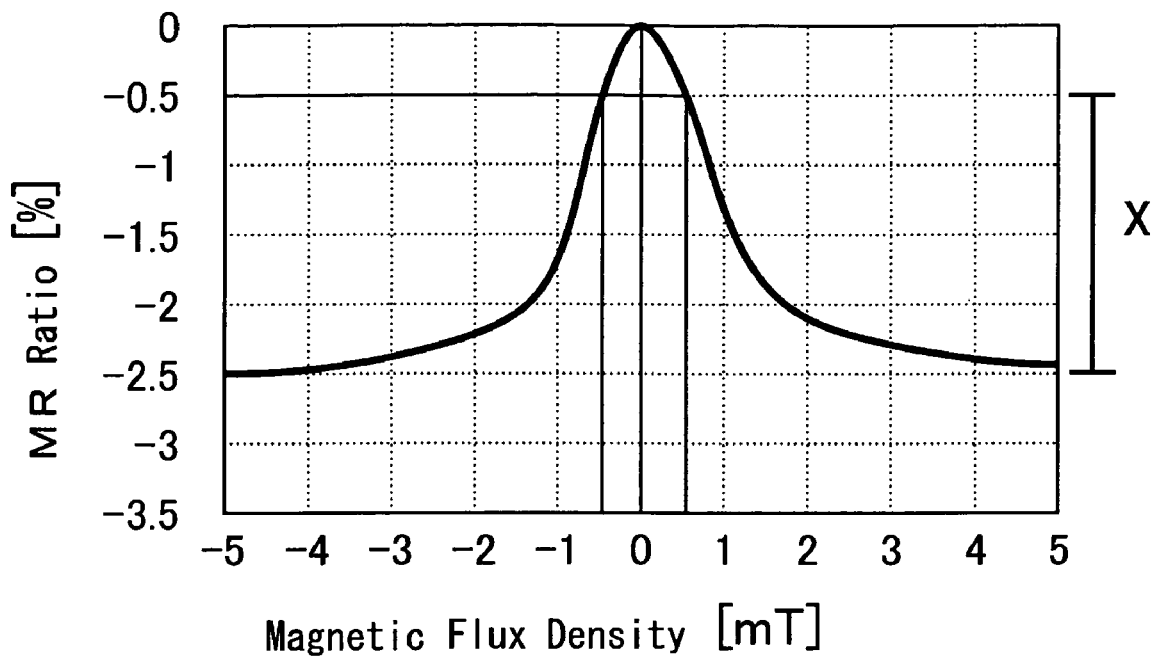
FIG. 15 is a graph showing an MR characteristic of a magneto-resistive element which is provided in a magnetic type encoder device to which at least an embodiment of the present invention is applied.

FIG. 15 is a graph showing an MR characteristic of a magneto-resistive element which is provided in a magnetic type encoder device to which at least an embodiment of the present invention is applied. A structure of the magnetic sensor device 3000 in this embodiment may be the same as that of the magnetic sensor device in the first embodiment which is described in FIGS. 2(*a*) through 2(*c*), FIG. 4, FIGS. 5(*a*) through 5(*d*), FIGS. 6(*a*) through 6(*c*) and FIGS. 7(*a*) through 7(*c*) and thus its detailed description is omitted.

The magneto-resistive element 7500 is provided with a magneto-resistance curve (MR characteristic) as shown in FIG. 15 and a magneto-resistance change rate varies depending on a magnetic flux density to be applied. The magneto-resistance change rate (MR ratio) R0 of the magneto-resistive element 7500 in this embodiment is −2.5%. Therefore, when the magneto-resistance change rate R of the magneto-resistive element 7500 is varied from −0.5% (=R0×0.2) to −2.5% by a rotary magnetic field generated by the permanent magnet 2300, this is used as an output signal. In other words, the magneto-resistive element 7500 in the magnetic sensor device 3000 detects a magnetic field in a region exhibiting a resistance change of 20% or more to the maximum resistance change rate from a resistance value in the non-magnetic field (region shown by the arrow X in FIG. 15) and outputs. Therefore, in this embodiment, although a rotary magnetic field detection method is employed, utilized magnetic field is not limited to the saturated sensitivity region. In other words, a magnetic field in the saturated sensitivity region and the semi-saturated sensitivity region corresponding to a skirt portion of the magneto-resistance curve of a magneto-resistive element where a resistance change rate is 20% or more with respect to the maximum resistance change rate from a resistance value in the non-magnetic field is utilized. In this embodiment, the "semi-saturated sensitivity region" means a region of magnetic field in the magneto-resistance curve of a magneto-resistive element where a resistance change rate is 20% or more with respect to the maximum resistance change rate from a resistance value in the non-magnetic field and up to the saturated sensitivity region.

(Structure of Magnetic Scale)

As shown in FIG. 14(A), the magnetic scale 2000 includes a strip-shaped permanent magnet 2300 extending along a moving direction. A flat plate-shaped base plate 2100 (base layer) is fixed to a rear face of the permanent magnet 2300 and a strip-shaped protection plate 2200 (protective layer) is fixed to a surface of the permanent magnet 2300. A thickness of the base plate 2100 is 0.5 mm and is, for example, made of a cold rolled special steel strip on which a rust prevention metal plating treatment such as chromate treatment is performed on its surface. Alternatively, the base plate 2100 may be structured of nonmagnetic material. The protection plate 2200 is a thin SUS plate whose thickness is 50 μm and its surface is coated for frosting in black by using coating material comprised of epoxy resin or the like. As described above, a malfunction of the magnetic sensor device 3000 can be prevented by coating for frosting on the surface of the protection plate 2200. Further, a sealant 2400 is applied to the side faces of the permanent magnet 2230 and filled between the base plate 2100 and the protection plate 2200 and hardened. The side faces of the permanent magnet 2300 are protected by the sealant 2400. A one-component moisture-curable adhesive mainly comprising silyl group-containing special polymer may be used as the sealant 2400.

As shown in FIG. 14(B), the permanent magnet 2300 is provided with a plurality of tracks 2500 in which an "N"-pole and an "S"-pole are alternately arranged along the moving direction and, in this embodiment, three lines of the tracks 2500 are juxtaposed in the widthwise direction. In this embodiment, positions of the "N"-pole and the "S"-pole in the two tracks 2500A and 2500B adjacent to each other are shifted by one magnetic pole in the moving direction, and positions of the "N"-pole and the "S"-pole in the two tracks 2500B and 2500C adjacent to each other are shifted by one magnetic pole in the moving direction. Therefore, positions of the "N"-pole and the "S"-pole in the two tracks 2500A and 2500C are coincided with each other in the moving direction. Further, it is preferable that a boundary portion 2520 between the track 2500A and the track 2500B adjacent to each other and a boundary portion 2520 between the track 2500B and the track 2500C are formed so that "N"-pole and "S"-pole in the boundary portions 2520 are directly contacted with each other, for example, without interposing a non-magnetized portion where a magnetic pole is not present or a nonmagnetic portion. However, when a large rotary magnetic field having a strength capable of being detected by the magnetic sensor device 1 can be generated, a no-magnetized portion where no magnetic pole is present or a nonmagnetic portion may be interposed at the boundary portion 2520 between the track 2500A and the track 2500B adjacent to each other and at the boundary portion 2520 between the track 2500B and the track 2500C.

In the magnetic scale 2000 structured as described above, the permanent magnet 2300 is an anisotropic magnet in which magnetic poles are directed only in the up-and-down direction and a rotary magnetic field in which directions of in-plane direction are changed is formed at edge portions 2510 in the widthwise direction of the tracks 2500A, 2500B and 2500C. Especially, in the boundary portion 2520 between the tracks 2500A and 2500B adjacent to each other and, in the boundary portion 2520 between the tracks 2500B and 2500C adjacent to each other, a rotary magnetic field having a large strength is generated. In addition, in this embodiment, in the boundary portion 2520 between the tracks 2500A and 2500B adjacent to each other and, in the boundary portion 2520 between the tracks 2500B and 2500C, the "N"-pole and the "S"-pole in the boundary portions 2520 are formed to contact directly with each other and thus a rotary magnetic field having a further larger strength is generated in the boundary portions 2520 of the tracks 2500A, 2500B and 2500C. In this embodiment, results of magnetic field analysis of directions of in-plane direction of magnetic fields of the permanent magnet 2300 for every matrix-shaped minute region are the same as the explanatory views shown in FIGS. 3(a) through 3(c) in the first embodiment and thus their detailed description is omitted.

In this embodiment, as shown in FIG. 14(B), the magneto-resistive element 7500 disposed in the sensor face 5000 of the magnetic sensor device 3000 is oppositely faced the boundary portions 2520 of the tracks 2500A, 2500B and 2500C to detect a rotary magnetic field generated in the end parts (boundary portion 2520) of the tracks 2500A, 2500B and 2500C. In this embodiment, a width dimension of one track 2500 is, for example, 1 mm and a width dimension of the magneto-resistive element 7500 is, for example, 2 mm. Further, since the magneto-resistive element 7500 is located at the center in the widthwise direction of the permanent magnet 2300, one end part 7510 in the widthwise direction of the magneto-resistive element 7500 is located at the center in the widthwise direction of the track 2500A, and the other end part 7520 is located at the center in the widthwise direction of the track 2500C.

In this embodiment, a thickness of the permanent magnet 2300 is 1 mm or more, preferably 2 mm or more, and the maximum energy product (BH)max is 1.2MGOe ($10\ \text{kJ/m}^3$) or more.

(Effects Due to Thickness of Permanent Magnet)

Figure 16A:
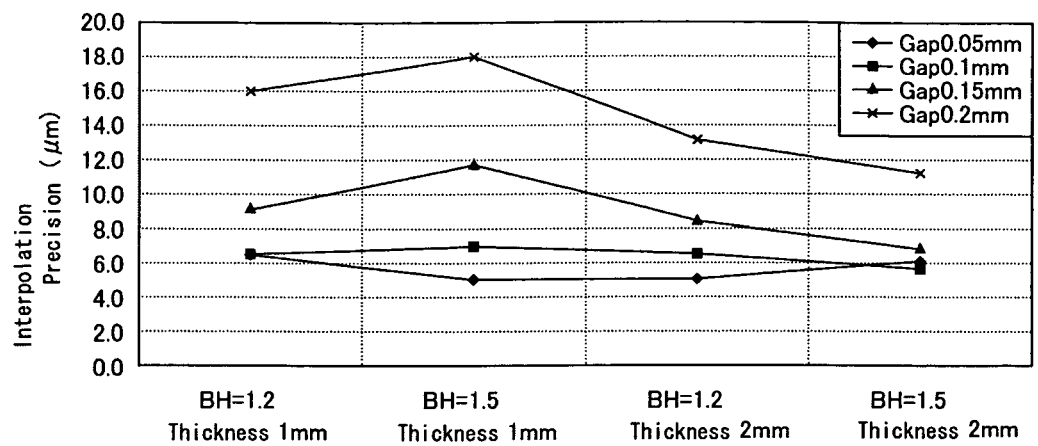
FIGS. 16(A) and 16(B) are respectively a graph showing a relationship between the maximum energy product and thickness of a permanent magnet provided in a magnetic scale to which at least an embodiment of the present invention is applied and interpolation precision, and a graph showing a relationship between the maximum energy product and thickness of a permanent magnet provided in a magnetic scale to which at least an embodiment of the present invention is applied and hysteresis.
Figure 16B:
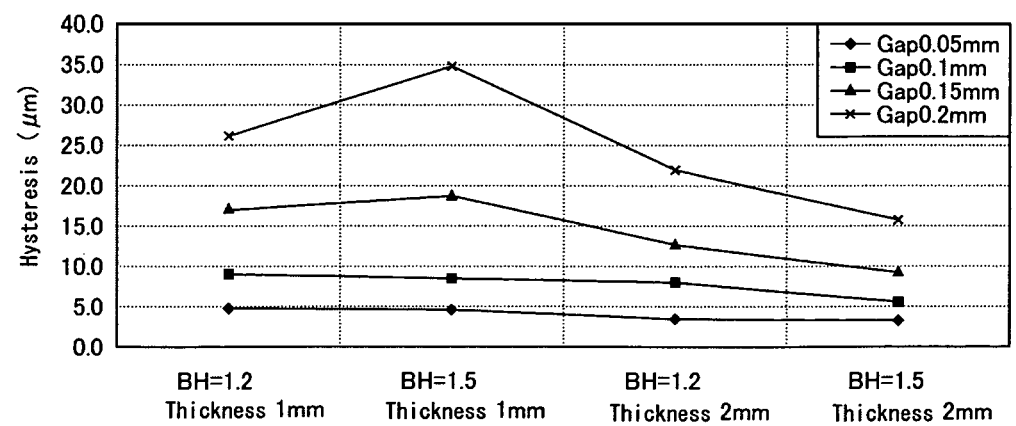

FIGS. 16(A) and 16(B) are respectively a graph showing a relationship between the maximum energy product and a thickness of a permanent magnet provided in a magnetic scale to which at least an embodiment of the present invention is applied and interpolation precision, and a graph showing a relationship between the maximum energy product and a thickness of a permanent magnet provided in a magnetic scale to which at least an embodiment of the present invention is applied and hysteresis.

In at least an embodiment of the present invention, magnet material whose maximum energy product (BH)max is 1.2MGOe or 1.5MGOe and whose thickness is 1 mm or 2 mm is used for the permanent magnet 2300 structuring the magnetic scale 2000. In each of the magnet materials, a space (Gap) between the magnetic scale 2000 and the magneto-resistive element 7500 provided in the magnetic sensor device 3000 is set to be 0.05 mm, 0.10 mm, 0.15 mm and 0.20 mm to measure interpolation precision and hysteresis.

As shown in FIG. 16(A), since the thickness of the permanent magnet 2300 is set to be 1 mm or 2 mm, interpolation precision is small. Further, when the magnetic scale 2000 in which the thickness of the permanent magnet 2300 is 2 mm is compared with the magnetic scale 2000 in which the thickness of the permanent magnet 2300 is 1 mm, interpolation precision of the magnetic scale 2000 in which the thickness of the permanent magnet 2300 is 2 mm was small in comparison with the magnetic scale 2000 in which the thickness of the permanent magnet 2300 is 1 mm. Especially, the interpolation precision of the magnetic scale 2000 having the permanent magnet 2300 whose (BH)max is 1.5MGOe and whose thickness is 2 mm was the smallest in comparison with other magnets. Further, as a gap space between the magnetic scale 2000 and the magneto-resistive element 7500 is widened, the interpolation precision of the magnetic scale 2000 in which the thickness of permanent magnet 2300 is 1 mm became larger than the magnetic scale 2000 in which the thickness of the permanent magnet 2300 is 2 mm.

Further, as shown in FIG. 16(B), hysteresis of the magnetic scale 2000 in which the thickness of the permanent magnet 2300 is 2 mm was small in comparison with the magnetic scale 2000 in which the thickness of the permanent magnet 2300 is 1 mm. Especially, the hysteresis of the magnetic scale 2000 having the permanent magnet 2300 whose (BH)max is 1.5MGOe and whose thickness is 2 mm was the smallest in comparison with other magnets. Further, when the magnetic scale 2000 in which the thickness of the permanent magnet 2300 is 2 mm is compared with the magnetic scale 2000 in which the thickness of the permanent magnet 2300 is 1 mm, as a gap space between the magnetic scale 2000 and the magneto-resistive element 7500 is widened, the hysteresis of the magnetic scale 2000 in which the thickness of permanent magnet 2300 is 1 mm became larger than the magnetic scale 2000 in which the thickness of the permanent magnet 2300 is 2 mm.

In the magnetic scale 2000, the detection accuracy is improved as the interpolation precision is smaller, and the detection accuracy is improved as the hysteresis is smaller. Therefore, detection accuracy of the magnetic scale 2000 in which the thickness of the permanent magnet 2300 is 2 mm is superior to the magnetic scale 2000 in which the thickness of the permanent magnet 2300 is 1 mm, and its effect is larger than that of the magnitude of (BH)max.

(Manufacturing Method for Magnetic Scale 2000)

A manufacturing method for the magnetic scale 2000 will be described below with reference to FIG. 14 and FIG. 17. FIGS. 17(A) through 17(E) are explanatory views showing a manufacturing method for a magnetic scale to which at least an embodiment of the present invention is applied. When magnetizing is to be performed, a method may be employed in which, in a state that a magnetizing head is disposed on one face of a magnet material and a yoke is disposed on the other face, an electric current is supplied to a magnetizing coil of the magnetizing head. Alternatively, another method may be employed in which magnetizing heads are disposed on both faces of magnet material and an electric current is supplied to a magnetizing coil. In FIG. 17, a magnetizing head is not shown.

Figure 17A:
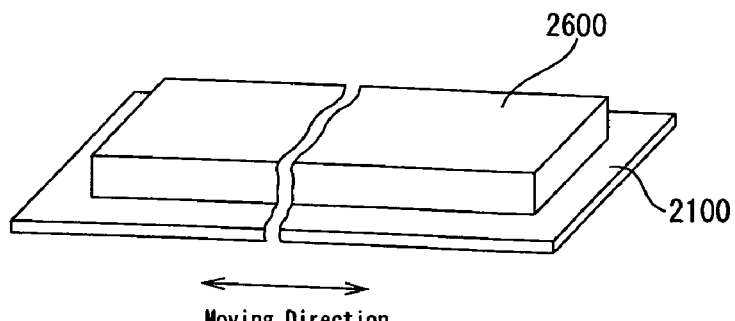
FIGS. 17(A) through 17(E) are explanatory views showing a manufacturing method for a magnetic scale to which at least an embodiment of the present invention is applied.
Figure 17B:
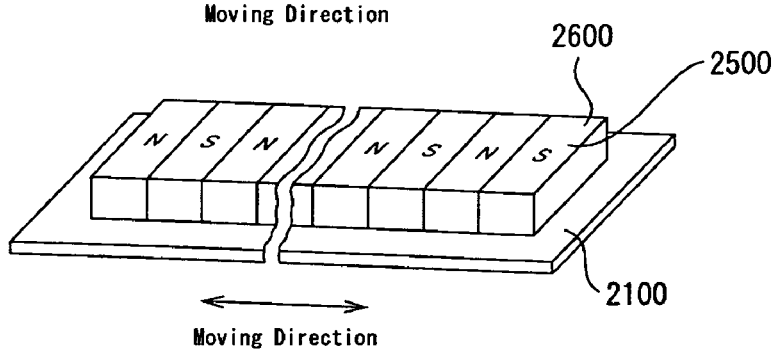

In order to manufacture the magnetic scale 2000, first, as shown in FIG. 17(A), the base plate 2100 is fixed on a rear face of the magnet material 2600 (permanent magnet 2300 in a non-magnetized state) with a double-stick tape. Next, as shown in FIG. 17(B), a magnetizing is performed on both faces of the magnet material 2600 by using magnetizing heads in a first magnetizing step to form a line of track 2500' in which an "N"-pole and an "S"-pole are alternately arranged along a longitudinal direction (moving direction) of the magnet material 2600.

Figure 17C:
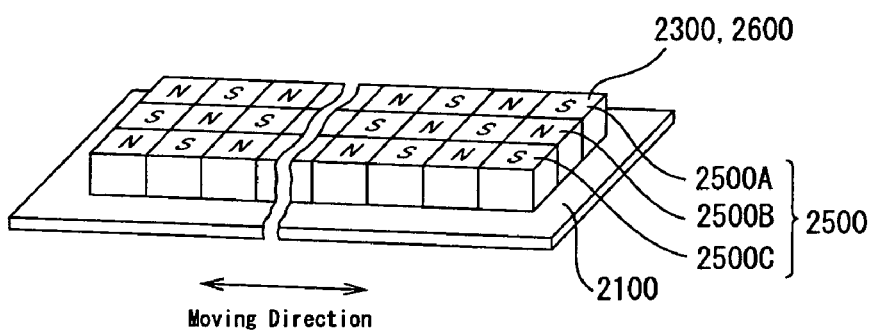

Next, as shown in FIG. 17(C), a magnetizing is performed on both faces of a part of the magnet material 2600 by using magnetizing heads in a second magnetizing step. A magnetizing pattern is overwritten on a part of the magnet material 2600 by this step and the permanent magnet 2300 on which three lines of track 2500 are formed is completed. In this embodiment, the permanent magnet 2300 is an anisotropic magnet whose magnetic poles are directed only in a front-rear direction. Further, the track 2500 is formed so that three lines of track 2500 (2500A, 2500B and 2500C) are formed in parallel to each other in a widthwise direction and, in addition, positions of the "N"-pole and the "S"-pole are formed to be shifted by one pole in the longitudinal direction between adjacent tracks of three lines of the tracks 2500A, 2500B and 2500C.

Figure 17D:
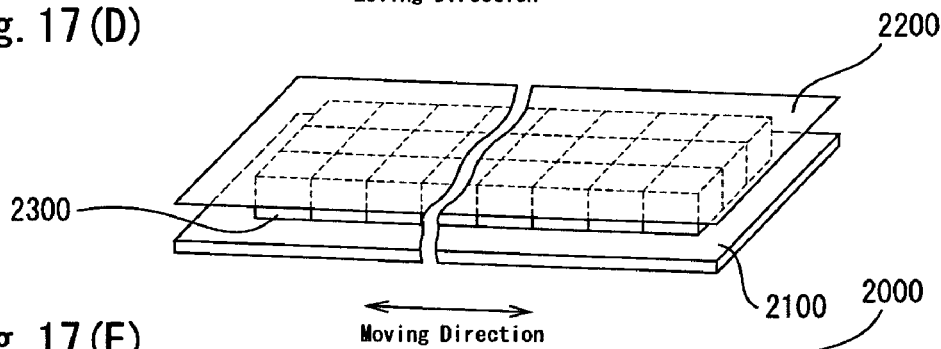
Figure 17E:
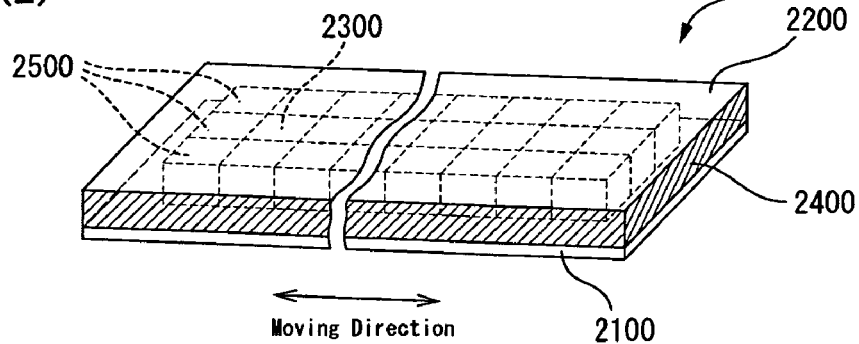

After the first magnetizing step and the second magnetizing step, as shown in FIG. 17(D), the protection plate 2200 is fixed on the surface of the permanent magnet 2300. After that, a sealant 2400 is applied to the side faces of the permanent magnet 2300 and filled between the base plate 2100 and the protection plate 2200 and hardened to obtain the magnetic scale 2000 shown in FIG. 17(E).

In this manufacturing method, a boundary portion between the track 2500A and the track 2500B adjacent to each other and a boundary portion between the track 2500B and the track 2500C are formed so that the "N"-pole and the "S"-pole in the boundary portions are directly contacted with each other, for example, without interposing a non-magnetized portion where a magnetic pole is not present or without interposing a nonmagnetic portion. However, when a rotary magnetic field having a strength capable of being detected by the magnetic sensor device 3000 shown in FIG. 14(A) can be generated, a non-magnetized portion where no magnetic pole is present or a nonmagnetic portion may be interposed at the boundary portion.

(Another Manufacturing Method for Magnetic Scale)

Figure 18A:
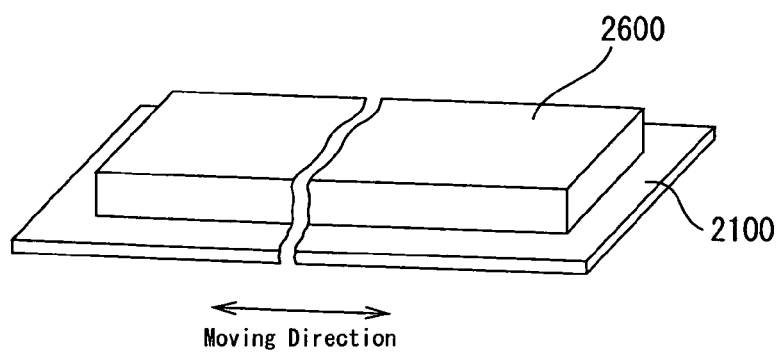
FIGS. 18(A) through 18(D) are explanatory views showing another manufacturing method for a magnetic scale to which at least an embodiment of the present invention is applied.
Figure 18B:
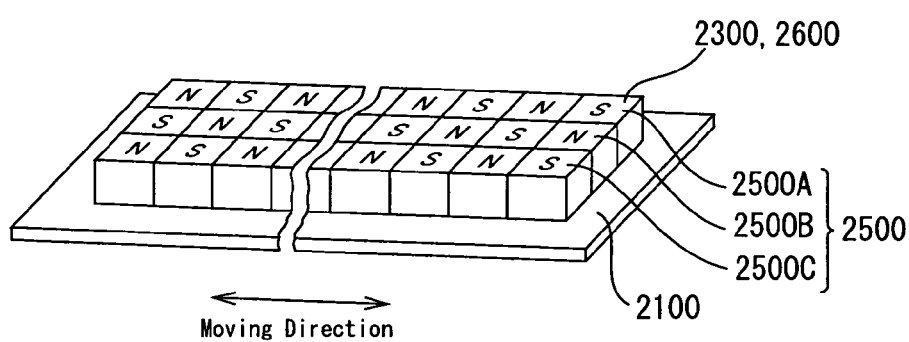

FIGS. 18(A) through 18(D) are explanatory views showing another manufacturing method for a magnetic scale to which at least an embodiment of the present invention is applied, and a magnetizing head is also not shown in FIG. 18. In this embodiment, in order to manufacture the magnetic scale 2000, first, as shown in FIG. 18(A), the base plate 2100 is fixed on a rear face of a magnet material 2600 (permanent magnet 2300 in a non-magnetized state) with a double-stick tape. Next, as shown in FIG. 18(B), multi-polar magnetization is performed on both faces of the magnet material 2600 by using a magnetizing head in a magnetizing step and the permanent magnet 2300 provided with three tracks 2500 is completed. In this embodiment, the permanent magnet 2300 is an anisotropic magnet in which magnetic poles are directed only in a front-rear direction. The track 2500 is formed so that three lines of track 2500 (2500A, 2500B and 2500C) are formed in parallel to each other in a widthwise direction and, in addition, positions of the "N"-pole and the "S"-pole are formed to be shifted by one pole in the longitudinal direction between adjacent tracks of three lines of the tracks 2500A, 2500B and 2500C.

Figure 18C:
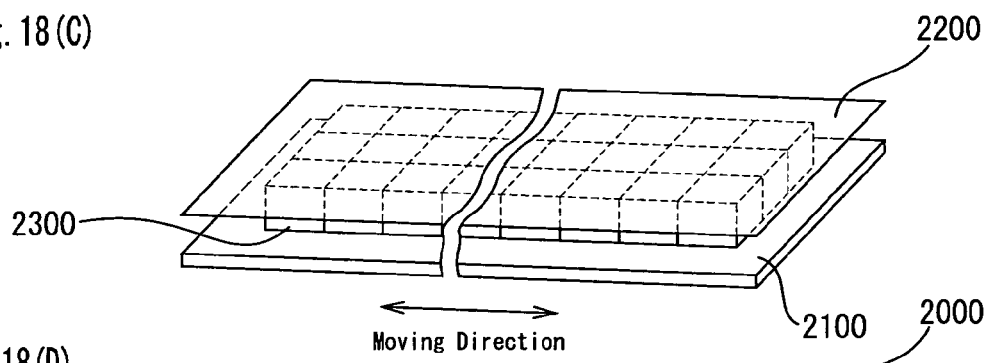
Figure 18D:
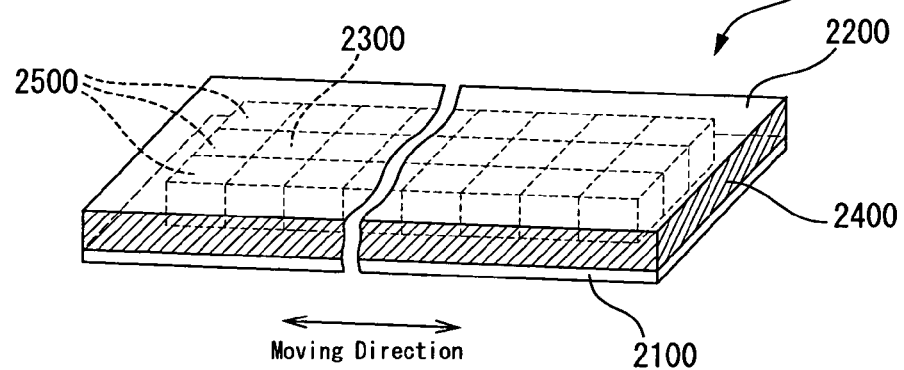

After the magnetizing step, as shown in FIG. 18(C), the protection plate 2200 is fixed on the surface of the permanent magnet 2300. After that, a sealant 2400 is applied to the side faces of the permanent magnet 2300 and filled between the base plate 2100 and the protection plate 2200 and hardened to obtain the magnetic scale 2000 shown in FIG. 18(D).

Even in this manufacturing method, when a rotary magnetic field having a strength capable of being detected by the magnetic sensor device 3000 shown in FIG. 14(A) can be generated at a boundary portion between the track 2500A and the track 2500B adjacent to each other and a boundary portion between the track 2500B and the track 2500C, a non-magnetized portion where no magnetic pole is present or a nonmagnetic portion may be interposed at the boundary portion.

Main Effects of Second Embodiment

As described above, in the magnetic type encoder device 1000 in this embodiment, since a rotary magnetic field formed in the magnetic scale 2000 is detected, even if a gap space dimension between the magnetic sensor device 3000 and the magnetic scale 2000 is set to be narrower in order to improve the S/N ratio, a sine-wave component can be stably obtained.

Further, in at least an embodiment of the present invention, a thickness of the permanent magnet 2300 is set to be 1 mm or more, preferably 2 mm or more. When the permanent magnet 2300 as described above is used, a magnetic field with which a rotary magnetic field can be detected with a high degree accuracy can be obtained. Therefore, the magneto-resistive element 7500 can further surely detect information from the magnetic scale 2000 and thus the detection accuracy is high.

Further, in the magnetic type encoder device 1000 in this embodiment, the magneto-resistance change rate (MR ratio) R0 of the magneto-resistive element 7500 structuring the magnetic sensor device 3000 is −2.5% and, when the magneto-resistance change rate R of the magneto-resistive element 7500 is varied from −0.5% (=R0×0.2) to −2.5%, this is used as an output signal. According to this structure, the magneto-resistive element 7500 can further surely detect information from the magnetic scale 2000 and thus the detection accuracy is high.

Further, in this embodiment, the magneto-resistive element 7500 is oppositely faced the boundary portions 2520 of the tracks 2500A, 2500B and 2500C to detect a rotary magnetic field. Therefore, different from a case in which the sensor face is perpendicularly directed to the permanent magnet 2300, a state where a magnetic field does not reach to a semi-saturated sensitivity region or a saturated sensitivity region at a position apart from the permanent magnet 2300 can be avoided. Accordingly, a detection accuracy of the magnetic type encoder device 1000 can be improved.

In addition, in this embodiment, the magneto-resistive element 7500 is faced with three lines of tracks 2500A, 2500 B and 2500 C in a widthwise direction and positions of "N"-pole and "S"-pole in a movable direction are coincided with each other in the tracks 2500A and 2500 C which face both end portions of the magneto-resistive element 7500. Therefore, even when a relative position in a widthwise direction between the permanent magnet 2300 and the magneto-resistive element 7500 is shifted, detection sensitivity is not changed.

In this embodiment, the end parts 7510 and 7520 in the widthwise direction of the magneto-resistive element 7500 are respectively located at a center in the widthwise direction of the tracks 2500A and 2500B. However, a structure may be employed in which a width dimension of the magneto-resistive element 7500 is wider than a width dimension of the permanent magnet 2300 and the end parts 7510 and 7520 of the magneto-resistive element 7500 are protruded outside in the widthwise direction from the permanent magnet 2300.

Second Example of Second Embodiment

A second example of the second embodiment in the present invention will be described below with reference to the accompanying drawings. A positional relationship in a plan view between a permanent magnet 2300 and a magneto-resistive element 7500 in a magnetic type encoder device in accordance with an embodiment in the present example is the same as the positional relationship in a plan view between the magnetic scale 9 (permanent magnet) and the magneto-resistive element 25 shown in FIG. 8 in the first embodiment. Therefore, the present example will be described with reference to FIG. 8.

In the first example of the second embodiment, the track number is three in lines. However, as shown in FIG. 8, a structure may be employed in which the track number is set to be two in lines and a magnetic scale 9 is structured so that positions of "N"-pole and "S"-pole are shifted by one magnetic pole in a movable direction between two adjacent tracks 91A and 91B and the magneto-resistive element 25 which is disposed on the sensor face 250 of the magnetic sensor device 1 is oppositely faced with the boundary portion 912 of the tracks 91A and 91B. In this example, the magneto-resistive element 25 disposed on the sensor face 250 is located at a center in the widthwise direction of the magnetic scale 9 (permanent magnet) and thus one end part 252 in the widthwise direction of the magneto-resistive element 25 is located at a center in the widthwise direction of the track 91A and the other end part 251 is located at a center in the widthwise direction of the track 91B.

In the magnetic type encoder device 100 structured as described above, results of magnetic field analysis of directions of in-plane direction of magnetic fields of the magnetic scale 9 (permanent magnet) for every matrix-shaped minute region are the same as the explanatory views shown in FIGS. 9(*a*) through 9(*c*) in the first embodiment and thus their detailed description is omitted. Also in this case, a rotary magnetic field generated at the boundary portion 912 between two adjacent tracks 91A and 91B can be detected, similarly to the magnetic sensor device 1 shown in the first embodiment, by the magnetic sensor device 3000 shown in FIG. 14(A).

Third Example of Second Embodiment

A third example of the second embodiment in the present invention will be described below with reference to the accompanying drawings. A planar positional relationship between a permanent magnet 2300 and a magneto-resistive element 7500 in a magnetic type encoder device in accordance with an embodiment in the present example is the same as the planar positional relationship between the magnetic scale 9 (permanent magnet) and the magneto-resistive element 25 shown in FIG. 12 in the first embodiment. Therefore, the present example will be described with reference to FIG. 12.

In the first example of the second embodiment, the track number is three in lines. However, as shown in FIG. 12, a structure may be employed in which a magneto-resistive element 25 disposed on the sensor face 250 faces five lines of tracks 91A, 91B, 91C, 91D and 91E in a widthwise direction and positions of "N"-pole and "S"-pole in a moving direction of the tracks 91A and 91E to which both end portions 251 and 252 of the magneto-resistive element 25 disposed on the sensor face 250 are oppositely faced are coincided with each other. Also in the case structured as described above, similarly to the first example of the second embodiment, even when a relative position in the widthwise direction between the permanent magnet 2300 and the magnetic sensor device 3000 is shifted, detection sensitivity is not changed.

Fourth Example of the Second Embodiment

Figure 19:
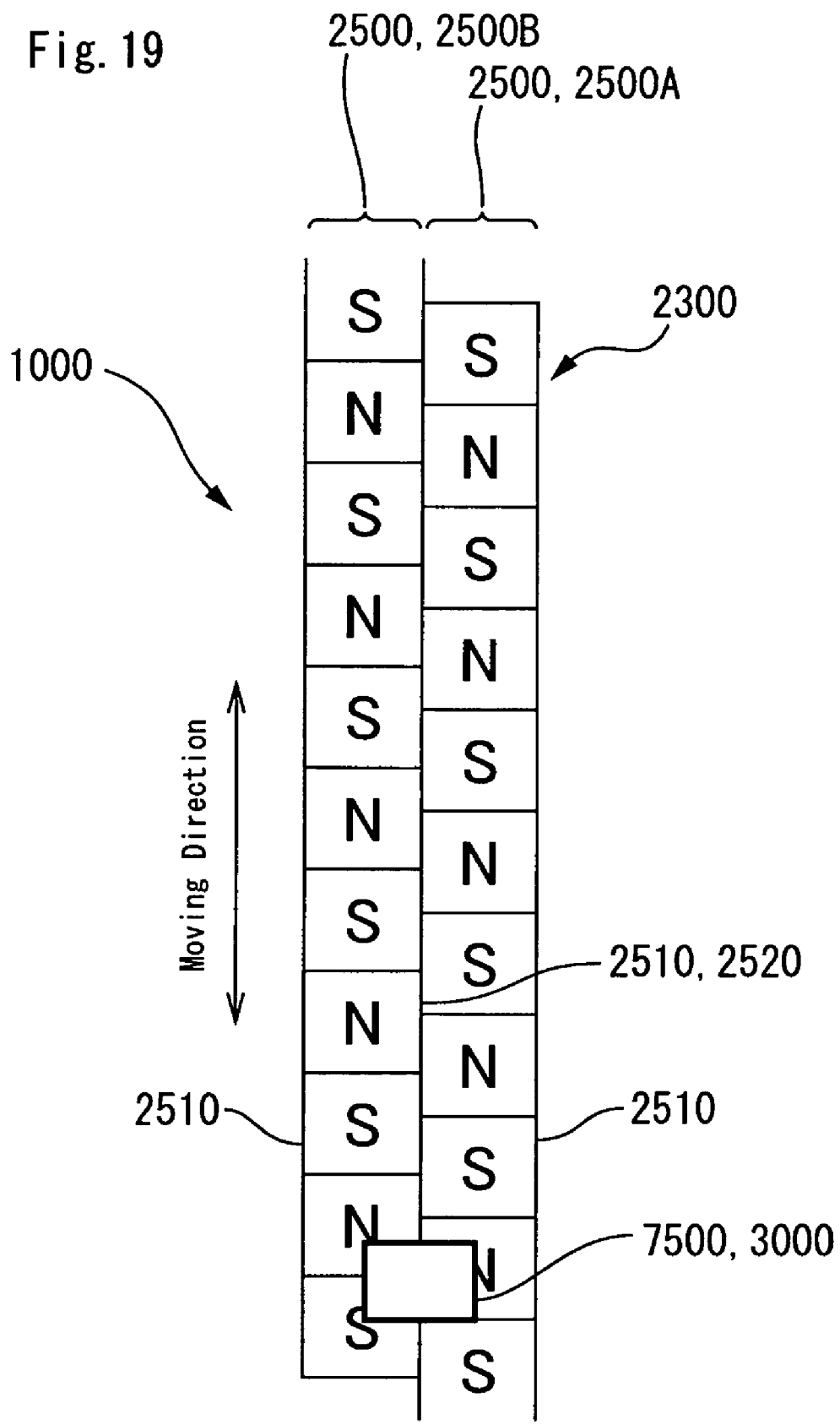
FIG. 19 is an explanatory view showing a planar positional relationship between a permanent magnet and a magnetic sensor in a magnetic type encoder device in accordance with a fourth example of a second embodiment in the present invention.

A fourth example of the second embodiment of the present invention will be described below with reference to the accompanying drawings. FIG. 19 is an explanatory view showing a planar positional relationship between a permanent magnet 2300 and a magnetic sensor device 3000 in a magnetic type encoder device in accordance with a fourth example of the second embodiment in the present invention.

In the first through third examples of the second embodiment, positions of "N"-pole and "S"-pole of two adjacent tracks are shifted by one magnetic pole in the moving direction. However, as shown in FIG. 19, positions of "N"-pole and "S"-pole of two adjacent tracks 2500A and 2500B may be shifted in the moving direction only by ½ magnetic pole. Also in the case structured as described above, a rotary magnetic field generated in the boundary portion 2520 of two adjacent tracks 2500A and 2500B can be detected with the magnetic sensor device 3000 shown in FIG. 14(A).

Fifth Example of Second Embodiment

A fifth example of the second embodiment of the present invention will be described below with reference to the accompanying drawings. A planar positional relationship between a permanent magnet 2300 and a magneto-resistive element 7500 in a magnetic type encoder device in accordance with an embodiment in the present example is the same as the planar positional relationship between the magnetic scale 9 (permanent magnet) and the magneto-resistive element 25 shown in FIG. 10 in the first embodiment. Therefore, the present example will be described with reference to FIG. 10.

In the first example of the second embodiment, the track number is three in lines but, in the present fifth example, one line of track 91 is formed as shown in FIG. 10. Further, in the magnetic scale 9 (permanent magnet), as described below with reference to FIG. 11 in the first embodiment, a rotary magnetic field in which directions of in-plane direction are changed is formed at edge portions 911 in the widthwise direction of the track 91.

In this example, the sensor face 250 (magneto-resistive element 25) of the magnetic sensor device 1 is oppositely faced to the edge portions 911 of the track 91. A width dimension of the track 91 is, for example, 1 mm and a width dimension of the sensor face 250 (magneto-resistive element 25) is, for example, 2 mm. Further, since the track 91 is located at a center in the widthwise direction of the sensor face 250 (magneto-resistive element 25), the end parts 250 and 251 in the widthwise direction of the sensor face 250 (end parts in the widthwise direction of the magneto-resistive element 25) are protruded to outer sides in the widthwise direction of the track 91.

In the magnetic type encoder device 100 structured as described above, results of magnetic field analysis of directions of in-plane direction of magnetic fields of the magnetic scale 9 (permanent magnet) for every matrix-shaped minute region are the same as the explanatory views shown in FIGS. 11(a) through 11(c) in the first embodiment and thus their detailed description is omitted. Also in this case, a rotary magnetic field in which directions of in-plane direction are changed is formed at the edge portions 911 in the widthwise direction of the track 91 like the regions surrounded by the circle L.

Therefore, in the magnetic type encoder device 100 in this embodiment, a rotary magnetic field formed at the edge portions 911 of the track 91 can be detected with the magnetic sensor device 3000 shown in FIG. 14(A) and, on the basis of the results, a relative moving speed and a relative moving distance between the magnetic sensor device 3000 and the permanent magnet 2300 can be detected.

Other Embodiments of the Second Embodiment

FIGS. 20(A) through 20(D) are explanatory views when a rotary encoder is structured by utilizing a magnetic type encoder device to which at least an embodiment of the present invention is applied.

Figure 20A:
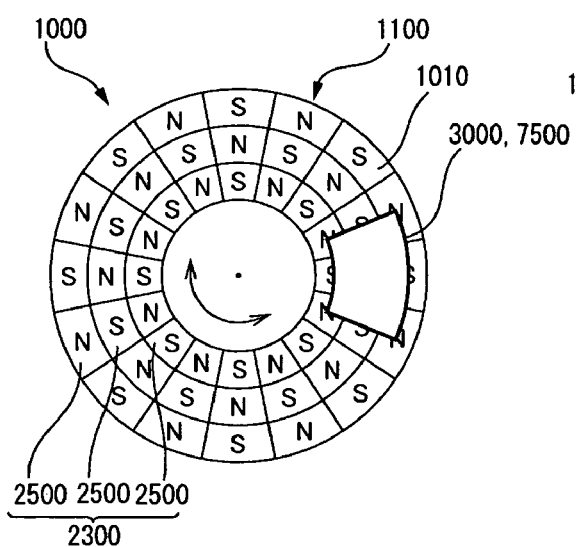
FIGS. 20(A) through 20(D) are explanatory views when a rotary encoder is structured by utilizing a magnetic type encoder device to which at least an embodiment of the present invention is applied.
Figure 20B:
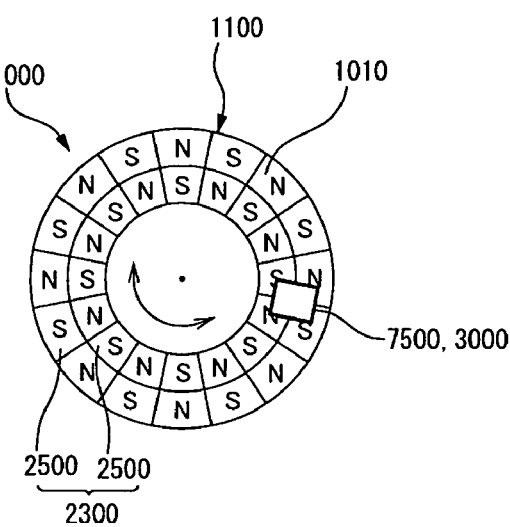
Figure 20C:
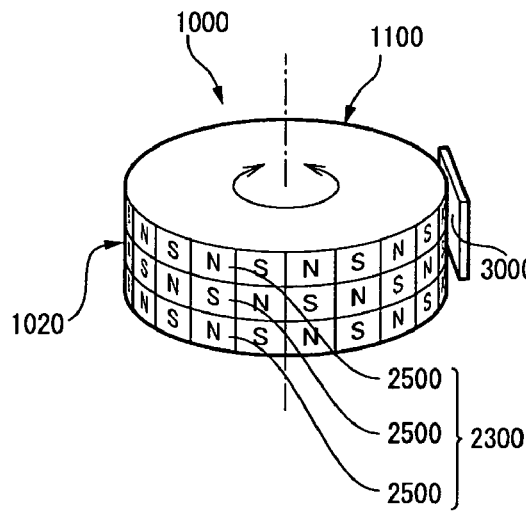
Figure 20D:
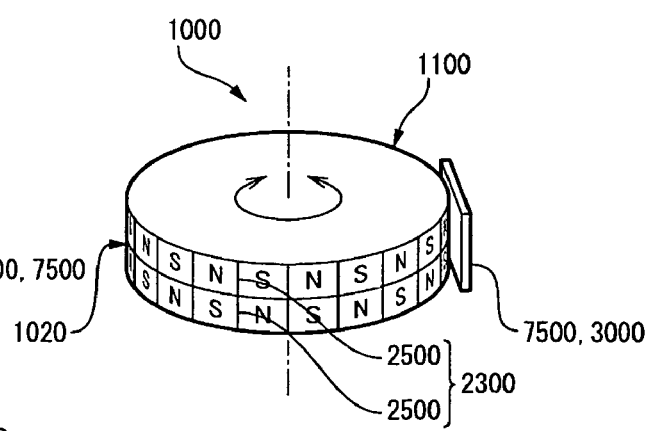
Figure 21:
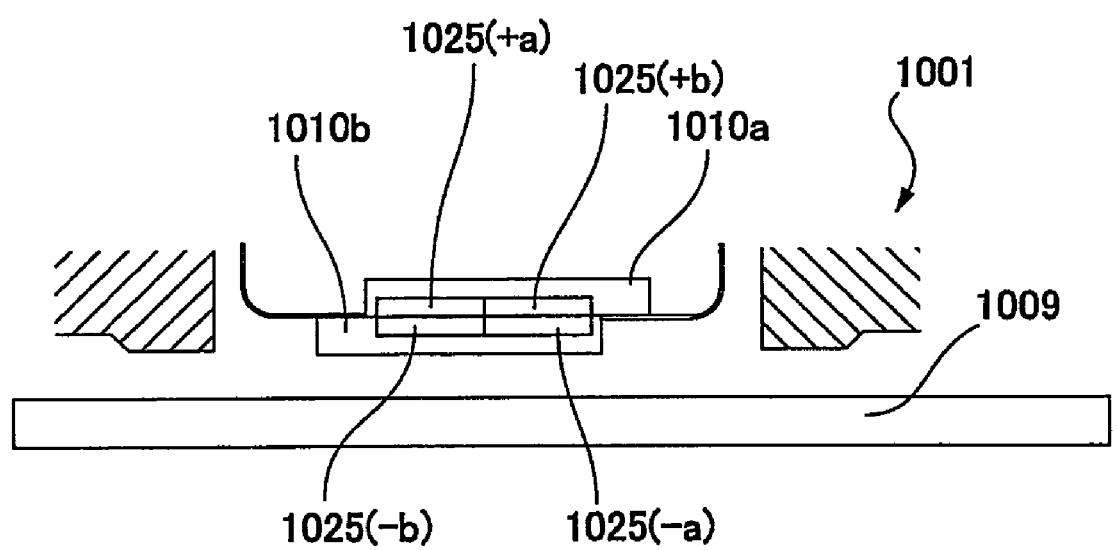
FIG. 21 is an explanatory view showing a conventional magnetic type encoder device.

All of the first through fifth examples of the second embodiment are an example in which a magnetic type encoder device is structured as a linear encoder. However, as shown in FIG. 20(A) through 20(D), a rotary encoder may be structured by utilizing the magnetic type encoder device 1000. In this case, as shown in FIGS. 20(A) and 20(B), a permanent magnet 2300 may be structured so that tracks 2500 are extended in a circumferential direction on an end face 1010 of a rotation body 1100 and a magneto-resistive element 7500 disposed on a sensor face of a magnetic sensor device 3000 may be oppositely faced to the tracks 2500 structured as described above. Alternatively, as shown in FIGS. 20(C) and 20(D), a permanent magnet 2300 may be structured so that tracks 2500 are extended in a circumferential direction on an outer peripheral face 1020 of a rotation body 1100 and a magneto-resistive element 7500 disposed on a sensor face of a magnetic sensor device 3000 may be oppositely faced to the tracks 2500 structured as described above.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic sensor device comprising:
"A"-phase magnetic resistance pattern and "B"-phase magnetic resistance pattern which are provided with a phase difference of 90° from each other;
wherein the "A"-phase magnetic resistance pattern is provided with "+a" phase magnetic resistance pattern and "−a" phase magnetic resistance pattern with a phase difference of 180° from each other for detecting movement of a magnetic scale, and the "B"-phase magnetic resistance pattern is provided with "+b" phase magnetic resistance pattern and "-b" phase magnetic resistance pattern with a phase difference of 180° from each other for detecting movement of the magnetic scale, and
wherein the "+a" phase magnetic resistance pattern, the "−a" phase magnetic resistance pattern, the "+b" phase magnetic resistance pattern and the "−b" phase magnetic resistance pattern are formed on a same face of one piece of board so that the "+a" phase magnetic resistance pattern and the "−a" phase magnetic resistance pattern are diagonally located and the "+b" phase magnetic resistance pattern and the "−b" phase magnetic resistance pattern are diagonally located.

2. The magnetic sensor device according to claim 1, wherein
one of the "+a" phase magnetic resistance pattern and the "−a" phase magnetic resistance pattern and one of the "+b" phase magnetic resistance pattern and the "−b" phase magnetic resistance pattern are connected to a first common terminal which is formed between a region formed with the one of the "+a" phase magnetic resistance pattern and the "−a" phase magnetic resistance pattern and a region formed with the one of the "+b" phase magnetic resistance pattern and the "−b" phase magnetic resistance pattern, and
the other of the "+a" phase magnetic resistance pattern and the "−a" phase magnetic resistance pattern and the other of the "+b" phase magnetic resistance pattern and the "−b" phase magnetic resistance pattern are connected to a second common terminal formed between a region formed with the other of the "+a" phase magnetic resistance pattern and the "−a" phase magnetic resistance pattern and a region formed with the other of the "+b" phase magnetic resistance pattern and the "−b" phase magnetic resistance pattern.

3. A magnetic type encoder device comprising:
a magnetic sensor device which is provided with "A"-phase magnetic resistance pattern and "B"-phase magnetic resistance pattern which are provided with a phase difference of 90° from each other; and
a magnetic scale which is provided with a track in which "N"-pole and "S"-pole are alternately arranged along a relative moving direction with respect to the magnetic sensor device;
wherein the "A"-phase magnetic resistance pattern is provided with "+a" phase magnetic resistance pattern and "−a" phase magnetic resistance pattern with a phase difference of 180° from each other for detecting movement of a magnetic scale, and the "B"-phase magnetic resistance pattern is provided with "+b" phase magnetic resistance pattern and "−b" phase magnetic resistance pattern with a phase difference of 180° from each other for detecting movement of the magnetic scale,
wherein the "+a" phase magnetic resistance pattern, the "−a" phase magnetic resistance pattern, the "+b" phase magnetic resistance pattern and the "−b" phase magnetic resistance pattern are formed on a same face of one piece of board so that the "+a" phase magnetic resistance pattern and the "−a" phase magnetic resistance pattern are diagonally located and the "+b" phase magnetic resistance pattern and the "−b" phase magnetic resistance pattern are diagonally located, and
wherein a sensor face of the magnetic sensor device which is structured of the "A"-phase magnetic resistance pattern and the "B"-phase magnetic resistance pattern oppositely facing the magnetic scale is oppositely faced to the track, and a rotary magnetic field in which directions of in-plane direction in the magnetic scale are changed is detected.

4. The magnetic type encoder device according to claim 3, wherein
one of the "+a" phase magnetic resistance pattern and the "−a" phase magnetic resistance pattern and one of the "+b" phase magnetic resistance pattern and the "−b" phase magnetic resistance pattern are connected to a first common terminal which is formed between a region formed with the one of the "+a" phase magnetic resistance pattern and the "−a" phase magnetic resistance pattern and a region formed with the one of the "+b" phase magnetic resistance pattern and the "−b" phase magnetic resistance pattern, and
the other of the "+a" phase magnetic resistance pattern and the "−a" phase magnetic resistance pattern and the other of the "+b" phase magnetic resistance pattern and the "−b" phase magnetic resistance pattern are connected to a second common terminal formed between a region formed with the other of the "+a" phase magnetic resistance pattern and the "−a" phase magnetic resistance pattern and a region formed with the other of the "+b" phase magnetic resistance pattern and the "−b" phase magnetic resistance pattern.

5. The magnetic type encoder device according to claim 3, wherein the sensor face is formed in a size in a widthwise direction of the track so that both end portions of the sensor face are protruded from edge portions of both ends in the widthwise direction of the track which is oppositely faced to the both end portions of the sensor face.

6. The magnetic type encoder device according to claim 3, wherein the sensor face of the magnetic sensor device is oppositely faced to an edge portion in a widthwise direction of the track and the magnetic sensor device is structured to detect changes in a direction of a rotary magnetic field in the plane of the track at the edge portion.

7. The magnetic type encoder device according to claim 6, wherein a plurality of the tracks is juxtaposed in a widthwise direction in the magnetic scale, and positions of "N"-pole and "S"-pole in adjacent tracks are shifted with each other in a relatively moving direction.

8. The magnetic type encoder device according to claim 7, wherein the positions of "N"-pole and "S"-pole in the adjacent tracks are shifted by one magnetic pole in the relatively moving direction.

9. The magnetic type encoder device according to claim 7, wherein three or more tracks are juxtaposed in lines in the widthwise direction in the magnetic scale, and
the sensor face is oppositely faced to three or more tracks in the widthwise direction, and positions of "N"-pole and "S"-pole in the relatively moving direction in tracks which are oppositely faced to both end portions of the sensor face are coincided with each other.

10. The magnetic type encoder device according to claim 7, wherein the "N"-pole and the "S"-pole are directly contacted with each other in adjacent tracks of a plurality of the tracks.

11. The magnetic type encoder device according to claim 3, wherein the magnetic type encoder device is structured as a linear encoder or a rotary encoder.

12. A magnetic type encoder device comprising:
a magnetic scale which is provided with a permanent magnet;
a magnetic sensor device which is provided with a magneto-resistive element for detecting magnetic field from the magnetic scale; and
a track which is formed in the permanent magnet so that "N"-pole and "S"-pole are alternately arranged along a relatively moving direction with respect to the magnetic sensor device;
wherein the magnetic sensor device is structured to detect changes in a direction of a rotary magnetic field in the plane of the track at an edge portion in a widthwise direction of the track;
a thickness of the permanent magnet is 1 mm or more; and
wherein a plurality of the tracks is juxtaposed in a widthwise direction in the permanent magnet and positions of "N"-pole and "S"-pole are shifted in the relatively moving direction in adjacent tracks of a plurality of the tracks.

13. The magnetic type encoder device according to claim 12, wherein the thickness of the permanent magnet is 2 mm or more.

14. The magnetic type encoder device according to claim 12, wherein a rear face of the magnetic scale is provided with a base layer and a front face of the magnetic scale is provided with a protective layer.

15. The magnetic type encoder device according to claim 12, wherein magnet material which structures the permanent magnet is set so that a maximum value (BH)max of an energy product which is obtained by a product of a magnitude H of an external magnetic field by a magnetic flux density B is 1.2 MGOe or more.

16. The magnetic type encoder device according to claim 12, wherein the positions of the "N"-pole and the "S"-pole are shifted in the relatively moving direction by one magnetic pole in the adjacent tracks of a plurality of the tracks.

17. The magnetic type encoder device according to claim 16, wherein the tracks are juxtaposed two lines or more in the widthwise direction in the permanent magnet.

18. The magnetic type encoder device according to claim 17, wherein
the tracks are juxtaposed three lines or more in the widthwise direction in the permanent magnet, and
the magnetic sensor device faces tracks with lines of an odd number of the three or more tracks, and
positions of the "N"-pole and the "S"-pole in the relatively moving direction are coincided with each other in tracks to which both end portions of the magnetic sensor device are oppositely faced.

19. The magnetic type encoder device according to claim 12, wherein the permanent magnet is an anisotropic magnet whose magnetic pole is directed only in a front-rear direction of the permanent magnet.

20. The magnetic type encoder device according to claim 12, wherein the magnetic type encoder device is structured as a linear encoder or a rotary encoder.

21. A manufacturing method for a magnetic scale which is provided with a permanent magnet in which a plurality of tracks each of which is provided with an "N"-pole and an "S"-pole alternately arranged is juxtaposed in a widthwise direction and positions of the "N"-pole and the "S"-pole are shifted in a relatively moving direction of the track in adjacent tracks, comprising:
a first magnetizing step in which magnet material to be structured as the permanent magnet is magnetized so that an "N"-pole and an "S"-pole are alternately arranged in the relatively moving direction of the track; and
a second magnetizing step in which a part of magnetic poles magnetized in the magnet material by the first magnetizing step is overwritten so that positions of an "N"-pole and an "S"-pole in adjacent tracks are shifted in the relatively moving direction of the track.

22. The manufacturing method for a magnetic scale according to claim 21, wherein anisotropic magnetizing in which magnetic poles are directed only in a front-rear direction of the magnet material is performed when magnetizing is performed to the magnet material.

23. The manufacturing method for a magnetic scale according to claim 21, wherein a base layer is superposed on a rear face of the magnet material, and then the magnetizing step is performed to the magnet material to form the permanent magnet, and a protective layer is formed on a surface of the permanent magnet after the magnetizing step has been performed.

* * * * *